US012035360B2

(12) United States Patent
Sun et al.

(10) Patent No.: US 12,035,360 B2
(45) Date of Patent: Jul. 9, 2024

(54) ACKNOWLEDGEMENT-BASED LINK ADAPTATION WITH LISTEN-BEFORE-TALK PROCEDURES

(71) Applicant: QUALCOMM Incorporated, San Diego, CA (US)

(72) Inventors: Jing Sun, San Diego, CA (US); Xiaoxia Zhang, San Diego, CA (US); Vinay Chande, San Diego, CA (US); Arumugam Chendamarai Kannan, San Diego, CA (US); Tao Luo, San Diego, CA (US); Srinivas Yerramalli, Hyderabad (IN); Juan Montojo, San Diego, CA (US); Aleksandar Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 292 days.

(21) Appl. No.: 17/125,106

(22) Filed: Dec. 17, 2020

(65) Prior Publication Data

US 2021/0250994 A1 Aug. 12, 2021

Related U.S. Application Data

(60) Provisional application No. 62/971,889, filed on Feb. 7, 2020.

(51) Int. Cl.
*H04W 74/08* (2024.01)
*H04L 5/00* (2006.01)
(Continued)

(52) U.S. Cl.
CPC ........... *H04W 74/08* (2013.01); *H04L 5/0048* (2013.01); *H04L 5/0055* (2013.01); *H04W 24/08* (2013.01); *H04W 24/10* (2013.01); *H04W 72/541* (2023.01)

(58) Field of Classification Search
CPC ..... H04W 74/08; H04W 24/08; H04W 24/10; H04W 72/082; H04W 72/1231;
(Continued)

(56) References Cited

U.S. PATENT DOCUMENTS

| | | | |
|---|---|---|---|
| 10,582,458 B2 * | 3/2020 | Sadek | H04W 72/56 |
| 2007/0105574 A1 * | 5/2007 | Gupta | H04W 72/20 |
| | | | 455/39 |

(Continued)

FOREIGN PATENT DOCUMENTS

| | | | | |
|---|---|---|---|---|
| CN | 104980252 A | * | 10/2015 | |
| CN | 107852302 B | * | 9/2020 | H04L 5/0053 |

(Continued)

OTHER PUBLICATIONS

International Search Report and Written Opinion—PCT/US2020/066247—ISA/EPO—Apr. 8, 2021.

*Primary Examiner* — Ayaz R Sheikh
*Assistant Examiner* — Louis Samara
(74) *Attorney, Agent, or Firm* — Arent Fox, LLP

(57) ABSTRACT

A first apparatus may be implemented as a user equipment (UE) or a component thereof. The first apparatus may be configured to receive a pre-grant message from a base station on a wireless channel. The first apparatus may be further configured to determine an interference level associated with the wireless channel. The first apparatus may then indicate the interference level to the base station in response to the pre-grant message. A second apparatus may be implemented as a base station or a component thereof. The second apparatus may be configured to transmit a pre-grant message to a UE on a wireless channel. The second apparatus may be further configured to detect for an acknowledgement (ACK) message responsive to the pre-grant message from the UE. The second apparatus may then determine an interference level associated with the wireless
(Continued)

channel proximate to the UE based on detecting for the ACK message.

30 Claims, 13 Drawing Sheets

(51) Int. Cl.
*H04W 24/08* (2009.01)
*H04W 24/10* (2009.01)
*H04W 72/541* (2023.01)

(58) Field of Classification Search
CPC ......... H04W 74/0816; H04W 72/0406; H04W 52/244; H04W 36/22; H04W 72/20; H04W 92/12; H04W 74/0808; H04W 72/23; H04W 72/56; H04L 5/0048; H04L 5/0055; H04L 1/007; H04L 25/0328; H04L 5/0094; H04L 5/0053; H04L 1/1858; H04B 7/0486
See application file for complete search history.

(56) References Cited

U.S. PATENT DOCUMENTS

| | | | |
|---|---|---|---|
| 2008/0025264 A1* | 1/2008 | Willenegger | H04B 7/022 370/333 |
| 2012/0099449 A1* | 4/2012 | Madan | H04W 74/0816 370/252 |
| 2012/0213092 A1* | 8/2012 | Sun | H04W 52/244 370/252 |
| 2014/0355529 A1 | 12/2014 | Zhu et al. | |
| 2015/0049650 A1* | 2/2015 | Choi | H04L 1/1854 370/278 |
| 2016/0302205 A1* | 10/2016 | Ji | H04L 5/0041 |
| 2016/0338053 A1* | 11/2016 | Park | H04W 74/0808 |
| 2018/0102807 A1* | 4/2018 | Chen | H04L 27/2657 |
| 2018/0241493 A1* | 8/2018 | Wang | H04J 11/0026 |
| 2019/0014598 A1* | 1/2019 | Yoshimura | H04W 72/04 |
| 2019/0090279 A1* | 3/2019 | Sun | H04W 72/23 |
| 2019/0124519 A1* | 4/2019 | Takiguchi | H04W 92/12 |
| 2019/0174542 A1* | 6/2019 | Lei | H04W 74/0808 |
| 2019/0253964 A1 | 8/2019 | Li et al. | |
| 2019/0254059 A1* | 8/2019 | Gulati | H04W 72/542 |
| 2019/0357255 A1* | 11/2019 | Sun | H04L 5/0094 |
| 2020/0162202 A1* | 5/2020 | Göktepe | H04L 1/1858 |
| 2020/0305170 A1* | 9/2020 | Nilsson | H04W 74/0808 |
| 2023/0224059 A1* | 7/2023 | Parkvall | H04L 5/1469 370/321 |

FOREIGN PATENT DOCUMENTS

| | | | | |
|---|---|---|---|---|
| WO | 2017007572 | A1 | 1/2017 | |
| WO | WO-2017007572 | A1 * | 1/2017 | ............ H04W 16/14 |
| WO | 2018106370 | A1 | 6/2018 | |
| WO | 2019046193 | A1 | 3/2019 | |
| WO | WO-2019057275 | A1 * | 3/2019 | ........... H04B 7/0486 |

* cited by examiner

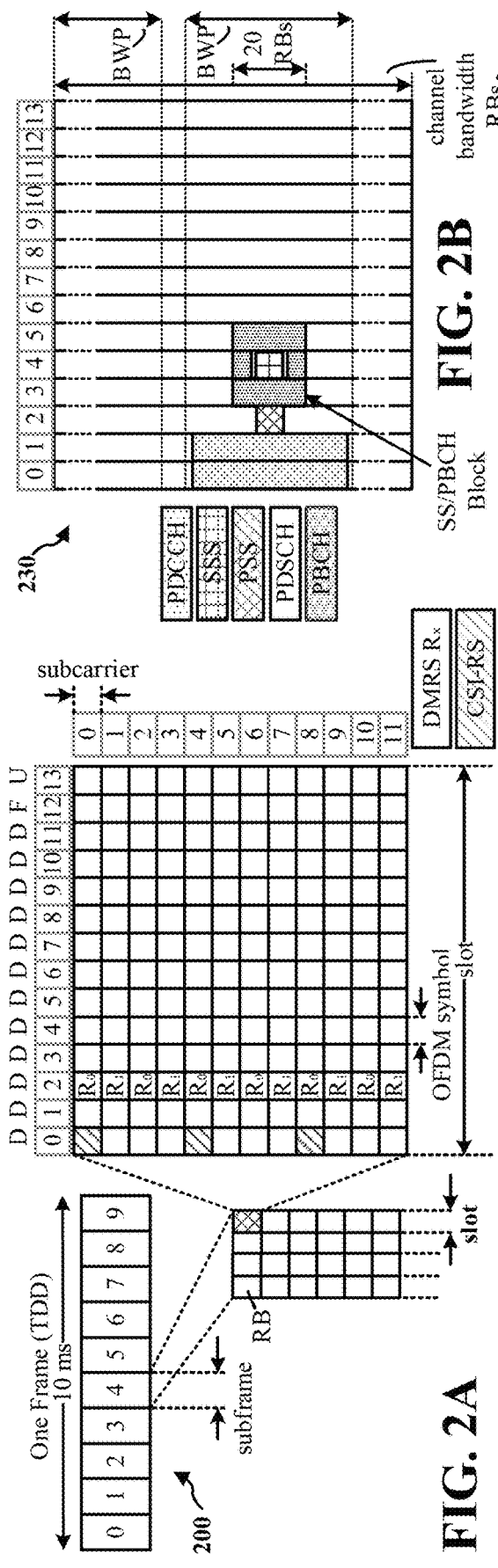
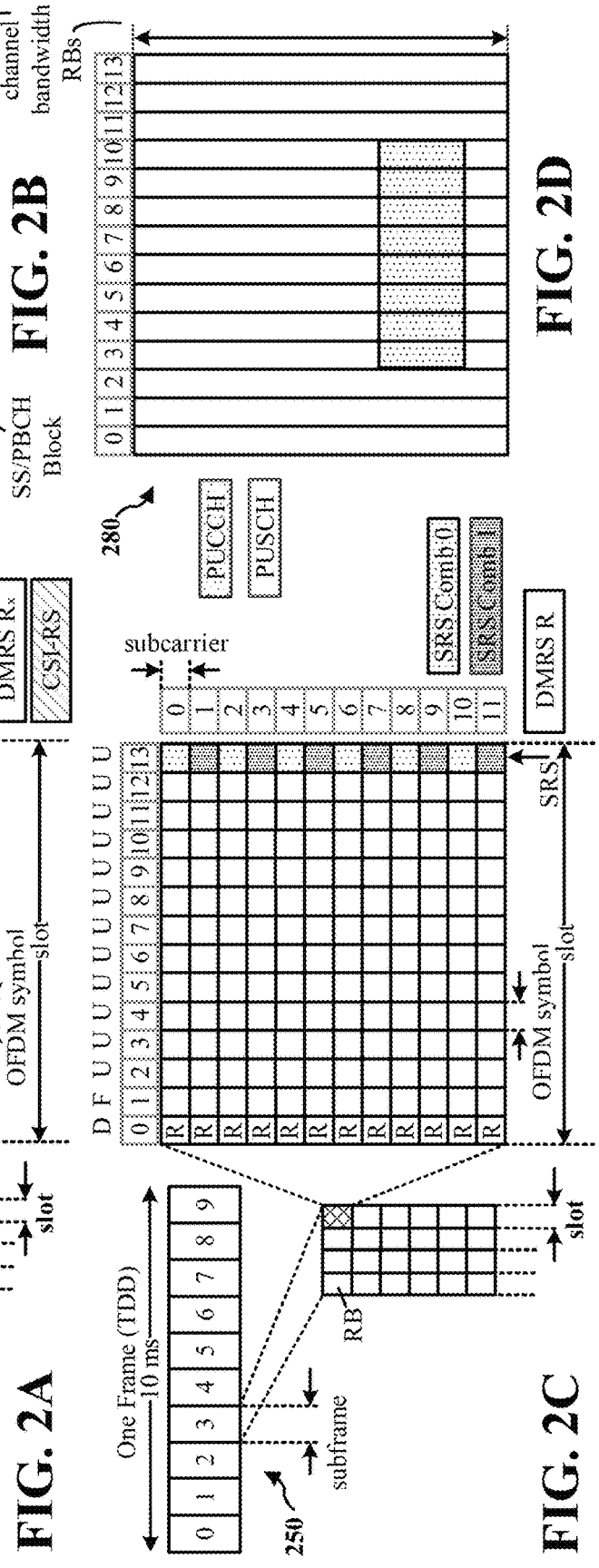
FIG. 2A
FIG. 2B
FIG. 2C
FIG. 2D

ACKNOWLEDGEMENT-BASED LINK ADAPTATION WITH LISTEN-BEFORE-TALK PROCEDURES

CROSS REFERENCE TO RELATED APPLICATION(S)

This application claims the benefit of U.S. Provisional Application Ser. No. 62/971,889, entitled "ACKNOWLEDGEMENT-BASED LINK ADAPTATION WITH LISTEN-BEFORE-TALK" and filed on Feb. 7, 2020, the disclosure of which is expressly incorporated by reference herein in its entirety.

BACKGROUND

Technical Field

The present disclosure generally relates to communication systems, and more particularly, to a user equipment configured to report interference to a base station in an acknowledgement message.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A transmitter and a receiver communicating on a millimeter-wave (mmW) link may observe different interference environments, such as different levels or amounts of interference, different types of interference, and so forth. For example, the receiver operations of receiving and decoding a signal from a transmitter may be adversely affected by noise, and in particular, noise within the environment proximate to the receiver, e.g., as some other noise within the environment proximate to the transmitter may be too distant from the receiver to be equally (or comparably) detected with the signal. While the transmitter may be able to determine the interference environment that is proximate to the transmitter, the receiver may experience more negative and/or undesirable effects of interference in the environment proximate to the receiver.

However, many approaches to managing interference environments may be implemented at transmitters, such as approaches in which a transmitter measures interference on resources detected by the transmitter. Such approaches may address the interference environment proximate to the transmitter but may fail to address the interference environment proximate to the receiver, which may benefit more from interference management directed to the environment of the receiver than the environment of the transmitter.

As areas and applications for wireless technologies continues to steadily grow, and relatedly, state-of-the-art wireless technologies become increasingly advanced and complex, progressively greater portions of the electromagnetic spectrum (specifically, the radio spectrum) are allocated and used. In particular, appreciable amounts of bandwidth on some cellular licensed bands may be consumed, e.g., to such a degree that some other bands may be sought to supplement a cellular licensed band. For example, some traffic of cellular licensed bands may be offloaded to some unlicensed bands, which may be populated by Wi-Fi and/or other similar wireless telecommunications deployments.

Thus, some radio access technologies (RATs), such as Long Term Evolution (LTE) and/or 5G New Radio (NR), may standardize various operations in at least one unlicensed band. For example, LTE-Unlicensed (LTE-U) and 5G NR-Unlicensed (NR-U) may be extensions to LTE and 5G NR standards, respectively, that allow access to at least one unlicensed band.

In some 5G NR radio access networks (RANs), traffic may be carried on some mmW bands, such as Frequency Range (FR) 2 including frequency bands (approximately) from 24.25 gigahertz (GHz) to 52.6 GHz. However, the mmW bands on which 5G NR traffic may be carried may be extended, for example, to some unlicensed bands in the mmW spectrum, such as a 60 GHz unlicensed band.

In unlicensed bands, scheduling of time/frequency resources may be less coordinated relative to licensed bands, e.g., as transmitters may not be assigned resources by a scheduling function, such as a gNodeB (gNB). Therefore, transmitters may perform various procedures to protect transmissions in unlicensed bands, such as procedures to detect energy (e.g., potential interference) on the wireless medium before transmission, procedures to reserve the wireless medium for transmission, and the like. Illustrative (non-limiting) examples of such procedures may include clear channel assessment (CCA) and listen-before-talk (LBT).

Such procedures intended to protect receivers from interference may be implemented by transmitters, and consequently, may fail to protect transmissions from interference that occurs in environments relatively more proximate to receivers. For example, a transmitter may perform CCA and, based on the result of CCA, may determine the channel is clear for transmission; however, CCA may fail to detect significant interference in the environment proximate to the receiver because the interference may be too distant from the transmitter to satisfy a threshold for energy detection and/or to warrant backing off of transmission.

In view of the foregoing, a need exists for approaches to addressing interference environments proximate to receivers, e.g., as an addition or alternative to addressing other interference environments proximate to transmitters. The present disclosure describes various techniques and solutions designed to protect receivers from interference in environments proximate to the receiver. In particular, the present disclosure describes various techniques and solutions in which the receiver informs the transmitter of the interference environment proximate to the receiver, e.g., prior to some data transmission from the transmitter to the receiver.

Accordingly, transmitters may be able to configure communication on mmW links based on interference experienced at receivers, e.g., so that the probability of successfully receiving and decoding signals by receivers may be increased. The various techniques and solutions described herein may be applicable across many different wireless communications networks, such as access networks, wireless local area networks (WLANs), and/or other similar networks. Further, the various techniques and solutions described herein may be of particular applicability to communication in unlicensed bands, including unlicensed bands accessed by RATs, such as 5G NR accessing 60 GHz unlicensed bands for 5G NR-U.

In one aspect of the disclosure, a first method, a first computer-readable medium, and a first apparatus are provided. The first apparatus may be implemented as a user equipment (UE) or a component thereof. The first apparatus may be configured to receive a pre-grant message from a base station on a wireless channel. The first apparatus may be further configured to determine an interference level associated with the wireless channel. The first apparatus may then indicate the interference level to the base station in response to the pre-grant message.

In another aspect of the disclosure, a second method, a second computer-readable medium, and a second apparatus are provided. The second apparatus may be implemented as a base station or a component thereof. The second apparatus may be configured to transmit a pre-grant message to a UE on a wireless channel. The second apparatus may be further configured to detect for an acknowledgement (ACK) message responsive to the pre-grant message from the UE. The second apparatus may then determine an interference level associated with the wireless channel proximate to the UE based on detecting for the ACK message.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

DETAILED DESCRIPTION

Figure 1:
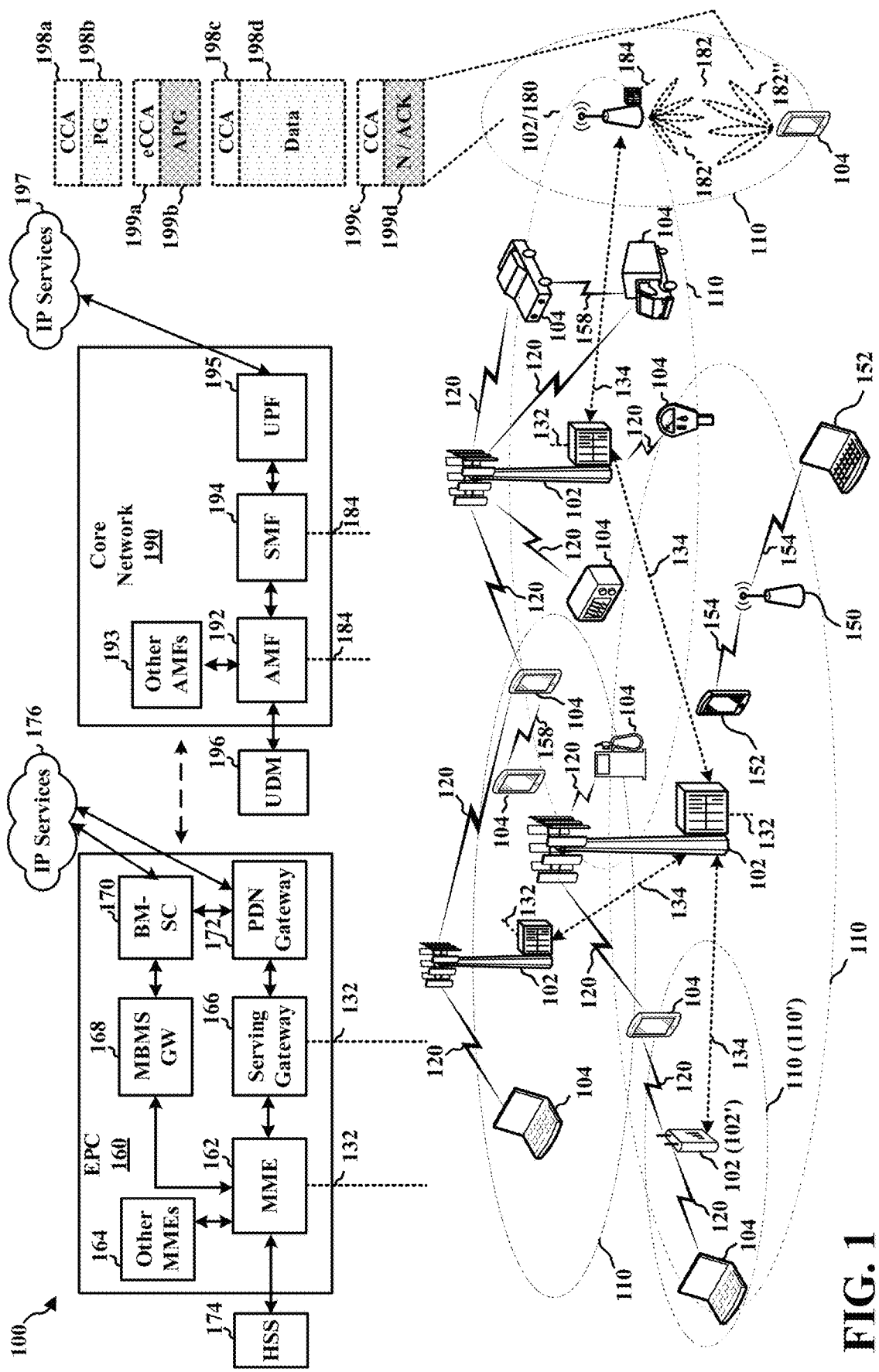
FIG. 1 is a diagram illustrating an example of a wireless communications system and an access network, in accordance with various aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, user equipment(s) (UE) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., 51 interface). The base stations 102 configured for 5G New Radio (NR) (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, Multimedia Broadcast Multicast Service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y megahertz (MHz) (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standards, LTE and/or NR based on the Third Generation Partnership Project (3GPP) standards, and so forth.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QoS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a Packet Switch (PS) Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, a UE 104 and a base station 102/180 may be configured to communicate in an access network and/or wireless local area network (WLAN), e.g., according to various protocols and/or standards, such as LTE and/or 5G NR standards promulgated by 3GPP, 802.11 standards promulgated by IEEE, and the like. In some aspects, the UE 104 and the base station 102/180 may communicate in an unlicensed spectrum, e.g., according to 5G NR-Unlicensed (NR-U), Wi-Fi, and/or other unlicensed spectrum, which may include at least a portion of a mmW and/or EHF band.

For some downlink bursts described in the present disclosure, both the base station 102/180 and the UE 104 may be configured to communicate on a wireless channel, which may be in an unlicensed spectrum. For example, the wireless channel may be in a 60 GHz band. As the wireless channel may be in an unlicensed spectrum, the base station 102/180 and the UE 104 may be configured to perform a contention-based procedure to determine whether the wireless channel is open.

In some aspects, the base station 102/180 may be configured to perform a clear channel assessment (CCA) 198a in order to determine whether the wireless channel is open (e.g., unoccupied). If CCA 198a by the base station 102/180 succeeds (e.g., indicating that the wireless channel is open), then the base station 102/180 may transmit a pre-grant (PG) message 198b to the UE 104.

The PG message 198b may include control information intended for the UE 104. For example, the PG message 198b may configure the UE 104 to further perform a contention-based procedure, such as extended CCA (eCCA) 199a. In some aspects, eCCA 199a may be similar to CCA 198a; however, the duration for which the UE 104 monitors the wireless channel (e.g., measures energy detected on the wireless channel) may be greater than the duration for which the base station 102/180 monitors the wireless channel (e.g., measures energy detected on the wireless channel).

During eCCA 199a, the UE 104 may measure the total energy detected on the wireless channel—e.g., in decibel-milliwatts (dBm)— for a duration configured for eCCA 199a. The UE 104 may compare the (total) energy measurement to a threshold, such as an energy detection (ED) threshold that may be preconfigured and/or defined by one or more standards or regulations to demarcate the point between the wireless channel being open and the wireless channel being busy (e.g., occupied).

The UE 104 may determine an interference level based on measuring energy detected on the wireless channel. For example, the UE 104 may quantize the energy measurement based on comparison of the energy measurement to at least the ED threshold. Thus, when the energy measurement satisfies (e.g., is greater than or equal to) the ED threshold, the UE 104 may determine that the interference level includes a quantized energy measurement of at least the ED threshold (e.g., at least a number of dBm of the ED threshold) and/or a quantized energy measurement of "busy" and/or "high." Similarly, when the energy measurement fails to satisfy (e.g., is less than) the ED threshold, the UE 104 may determine that the interference level includes a quantized energy measurement of less than the ED threshold (e.g., at most a number of dBm of the ED threshold) and/or a quantized energy measurement of "unoccupied" and/or "open."

Potentially, the UE 104 may determine the interference level based on comparing the energy measurement to a plurality of thresholds, e.g., including at least one other threshold less than the ED threshold (e.g., another number of dBm less than the ED threshold). Thus, when the energy measurement satisfies the other threshold but fails to satisfy the ED threshold, the UE 104 may determine that the interference level includes a quantized energy measurement of at least the other threshold and at most the ED threshold (e.g., at least a number of dBm between the other threshold and the ED threshold) and/or a quantized energy measurement of "medium" (but still open). When the energy measurement fails to satisfy the other threshold (and therefore also fails to satisfy the ED threshold), the UE 104 may determine that the interference level includes a quantized energy measurement of less than the other threshold (e.g., at most a number of dBm of the other threshold) and/or a quantized energy measurement of "low" and/or "open."

Based on eCCA 199a, the UE 104 may be configured to indicate the interference level to the base station 102/180 in response to the PG message 198b. The base station 102/180 may expect acknowledgement (ACK) feedback responsive to the PG message 198b. In some aspects, the UE 104 may refrain from transmitting ACK feedback to the base station 102/180 when the energy measurement satisfies (e.g., is greater than or equal to) the ED threshold.

Accordingly, the base station 102/180 may determine that the UE 104 indicates an interference level satisfying the ED threshold (e.g., an interference level of "busy" or "occupied") when the ACK feedback responsive to the PG message 198b is absent from the wireless channel, and therefore, is not received by the base station 102/180. In other words, the absence of the ACK feedback responsive to the PG message 198b on the wireless channel may implicitly indicate to the base station 102/180 that the wireless channel is busy, occupied, and/or has energy thereon at least equal to the ED threshold.

In some aspects of implicitly indicating the wireless channel is busy and/or occupied, the base station 102/180 may refrain from transmitting data. Instead, the base station 102/180 may back off (e.g., for the duration of a back off timer) from data transmission while the base station 102/180 waits for the wireless channel to become open, at which point the base station 102/180 may retry another data burst.

In some aspects of implicitly indicating the wireless channel is busy and/or occupied, the base station 102/180 may configure transmission of at least a portion of a data burst based on a relatively high level of interference. For example, the base station 102/180 may increase transmission power, select a different modulation scheme suitable for a high interference environment, select a different coding rate suitable for a high interference environment, and so forth. The base station 102/180 may then continue with the data burst, such as by performing CCA 198c and, if CCA 198c indicates the wireless channel (e.g., proximate to the base station 102/180) is open, transmitting the data 198d according to the transmission configuration.

In some aspects, the UE 104 may transmit an ACK message 199b responsive to the PG message (also referred to as an "ACK-to-PG" or "APG") when the (total) energy measurement fails to satisfy the ED threshold. The UE 104 may indicate the interference level in the ACK message 199b. For example, the ACK message 199b may include information indicating the interference level as the quantized energy measurement, such as "low" or "medium" depending upon comparison of the energy measurement to the plurality of thresholds. Thus, the UE 104 may indicate, to the base station 102/180, the interference level associated with the wireless channel in the environment proximate to the UE 104.

The base station 102/180 may receive the ACK message 199b, and therefore, may be informed of the interference level associated with the wireless channel proximate to the UE 104. Based on the ACK message 199b, the base station 102/180 may configure transmission of at least a portion of the data 198d to be transmitted to the UE 104. For example, the base station 102/180 may configure a modulation scheme, a coding rate, and other similar parameters, e.g., in order to increase the probability of successfully decoding the data 198d by the UE 104 given the interference environment proximate to the UE 104.

In advance of data transmission, however, the base station 102/180 may perform another CCA 198c, e.g., in order to confirm that the wireless channel remains open for the data burst. If CCA 198c prior to data transmission succeeds (e.g., the measured energy fails to satisfy the ED threshold and the wireless channel is open), then the base station 102/180 may transmit the data 198d to the UE 104. For example, the base station 102/180 may transmit the data 198d based one or more transmission parameters configured by the base station 102/180 according to the interference level associated with the wireless channel proximate to the UE 104, as indicated by the ACK message 199b.

The UE 104 may receive the data 198d from the base station 102/180, and in response, the UE 104 may generate ACK or negative ACK (NACK) (or non-ACK) feedback in order to indicate whether the data 198d is received and successfully decoded. That is, the UE 104 may generate ACK feedback when the UE 104 receives and successfully decodes the data 198d, or the UE 104 may generate NACK feedback when the UE 104 does not receive or unsuccessfully decodes the data 198d. The UE 104 may include the applicable one of the ACK or NACK feedback in an ACK/NACK message 199d.

In order to transmit the ACK/NACK message 199d, the UE 104 may first perform CCA 199c. If performance of CCA 199c results in an energy measurement indicating that the wireless channel is open, then the UE 104 may transmit the ACK/NACK message 199d to the base station 102/180 in order to indicate whether the data 198d is received and/or successfully decoded. If the performance of CCA 199c results in an energy measurement indicating that the wireless channel is busy, then the UE 104 may back off and wait until the wireless channel is open until transmitting the ACK/NACK message 199d.

Various other aspects related to informing a base station of an interference environment proximate to a UE for configuration of a data burst transmission from the base station to the UE are further described herein.

Although the present disclosure may focus on 5G NR, and unlicensed bands, the concepts and various aspects described herein may be applicable to other similar areas, such as LTE, LTE-Advanced (LTE-A), LTE-Unlicensed (LTE-U), Licensed Assisted Access (LAA), Code Division Multiple Access (CDMA), Global System for Mobile communications (GSM), other licensed bands, and/or other wireless and/or radio access technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency-division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kilohertz (kHz), where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry at least one reference (pilot) signal (RS) for the UE. In some configurations, an RS may include at least one demodulation RS (DM-RS) (indicated as Rx for one particular configuration, where 100x is the port number, but other DM-RS configurations are possible) and/or at least one channel state information (CSI) RS (CSI-RS) for channel estimation at the UE. In some other configurations, an RS may additionally or alternatively include at least one beam measurement (or management) RS (BRS), at least one beam refinement RS (BRRS), and/or at least one phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) ACK/NACK feedback. The PUSCH carries data, and may additionally be used to carry a buffer status report (BSR), a power headroom report (PHR), and/or UCI.

Figure 3:
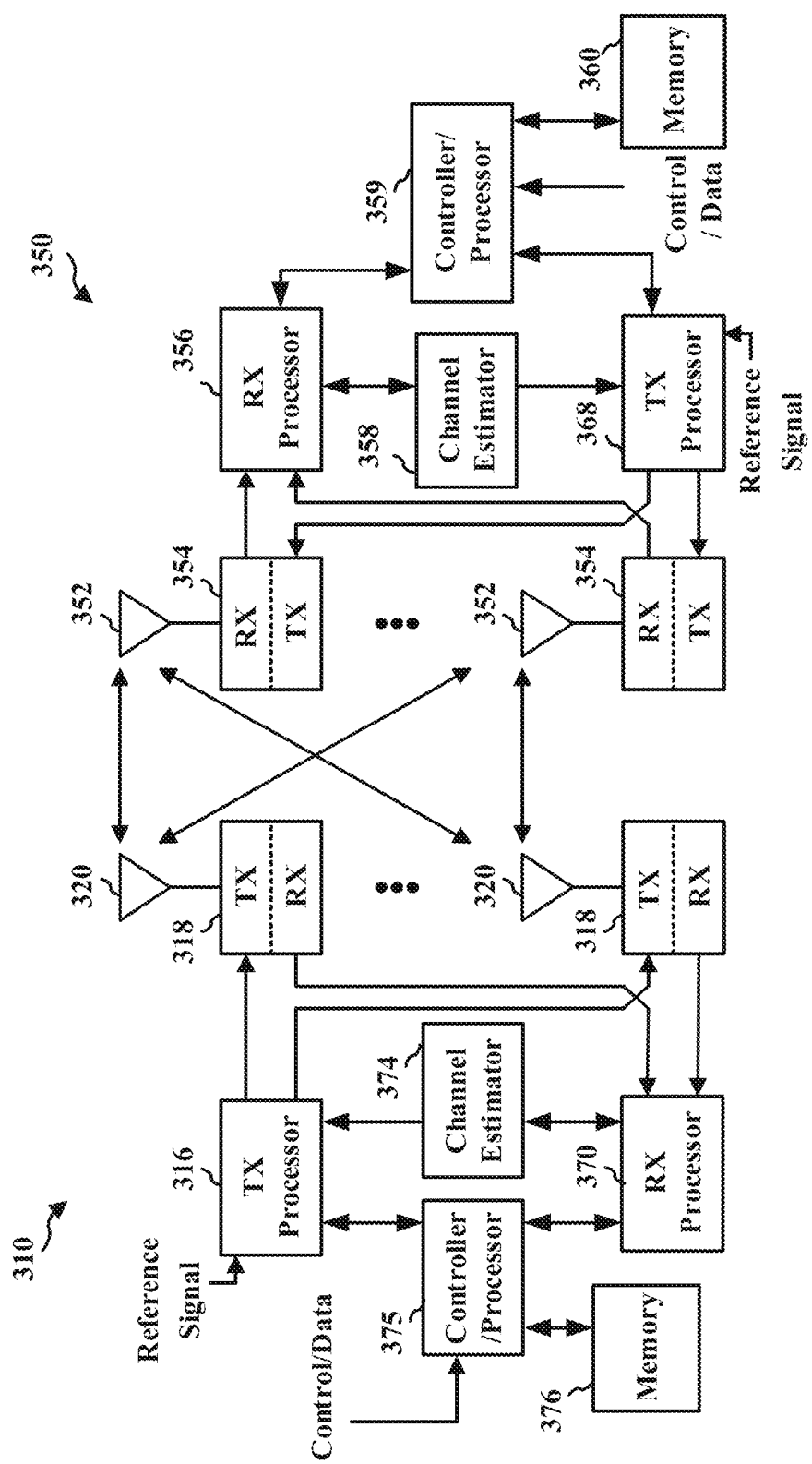
FIG. 3 is a diagram illustrating an example of a base station and user equipment (UE) in an access network, in accordance with various aspects of the present disclosure.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350.

IP packets from the controller/processor 375 may be provided to the EPC 160. The controller/processor 375 is also responsible for error detection using an ACK and/or NACK protocol to support HARQ operations.

In some aspects, at least one of the TX processor 368, the RX processor 356, and the controller/processor 359 may be configured to perform aspects in connection with receiving the PG message 198$b$, performing eCCA 199$a$, transmitting the ACK message 199$b$, receiving the data 198$d$, performing CCA 199$c$, and/or transmitting the ACK/NACK message 199$d$, as shown in FIG. 1 supra.

In some other aspects, at least one of the TX processor 316, the RX processor 370, and the controller/processor 375 may be configured to perform aspects in connection with performing CCA 198$a$, transmitting the PG message 198$b$, receiving the ACK message 199$b$, performing CCA 198$c$, transmitting the data 198$d$, and/or receiving the ACK/NACK message 199$d$, as shown in FIG. 1 supra.

In some mmW wireless communications systems, wireless channels on which transmissions are carried may include some unlicensed bands, such as a 60 GHz band (e.g., for 5G NR-U). Resource management in some unlicensed bands may not be as coordinated and/or controlled as resource management in some licensed bands, such as 5G NR FR2. For example, time/frequency resources in some unlicensed bands may not be allocated and/or scheduled by a gNB or other macro base station, as with some licensed bands. Therefore, the probability of experiencing interference to transmissions in some unlicensed bands may be increased, e.g., relative to licensed bands.

In order to mitigate transmission collisions, transmitters may be configured to perform contention-based procedures to decide when to transmit, such as listen-before-talk (LBT), CCA, and/or other similar contention-based procedure. In an LBT procedure, a transmitter may first sense one or more channels (e.g., mmW channels) in order to configure communication with a receiver. For example, the transmitter may select an open channel using an LBT procedure and/or the transmitter may refrain from communicating with the receiver until a channel is open.

Similarly, in a CCA procedure, a wireless device (e.g., a UE, a base station, etc.) may perform ED. For ED, the device measures the total energy, e.g., in dBm, on a wireless channel over a CCA duration. The device may then determine whether the wireless channel is busy by comparing the measured total energy with an ED threshold. In some aspects, the ED threshold may be predefined by one or more regulations and/or standards (e.g., 3GPP and/or 802.11 standards)—for example, the ED threshold may be 62 dBm.

If the device determines that the measured total energy satisfies (e.g., is equal to or greater than) the ED threshold, then the device may determine that the wireless channel is busy or occupied. However, if the device determines that the measured total energy fails to satisfy (e.g., is less than) the ED threshold, then the device may determine that the channel is open, and the device may transmit on the channel.

In some aspects, CCA duration may be one or more symbols and/or one or more slots, which may immediately precede a transmission. Additionally or alternatively, an eCCA may be configured, which may have an eCCA duration over which to measure energy that is relatively longer than CCA duration. Relative to CCA, then, eCCA may provide a greater number of symbols and/or slots for measuring energy on the channel, and potentially, performing operations based on the measured energy.

Typically, contention-based procedures, including LBT and CCA, are performed at the transmitter side. As the transmitter is aware of when the transmitter will transmit, the transmitter initiates LBT or CCA (immediately) prior to transmitting in order to ensure a wireless channel is open (and potentially configure transmission according to the current interference environment). However, interference is not uniform along the wireless channel, e.g., due to differences in geographical position, obstructions or blockers, timing, and other variables affecting attenuation, delay, and/or other fading. Consequently, the transmitter may be able to determine the interference in one environment proximate to the transmitter, but such an interference determination may be inapplicable and/or inaccurate with respect to interference in another environment proximate to the receiver.

For example, the energy from interference in the environment surrounding the receiver may be too distant from the transmitter to be equally (or comparably) measured by the transmitter during LBT or CCA (e.g., ED). That is, signals viewed as interference by the receiver may become too attenuated to be meaningfully measured as energy when propagating to the transmitter, such as when the source of the interfering signals is proximate (e.g., closer, nearby, etc.) to the receiver and remote (e.g., further, distant, etc.) from the transmitter. Thus, when the transmitter measures energy for LBT or CCA and determines the measured energy fails to satisfy an interference threshold (e.g., ED threshold), the energy of interference proximate to the receiver may actually be appreciably greater than the interference threshold, and potentially great enough to prevent the receiver from receiving and successfully decoding a transmission.

In effect, contention-based procedures, including LBT and CCA, may protect the receiver from interference that is proximate that to the transmitter, but the receiver may experience greater benefits (e.g., higher probably of successfully decoding, interference cancellation, etc.) from mechanisms designed to protect the receiver from interference that is proximate to the receiver. However, contention-based procedures may lack features for protecting the receiver, and there may be no mechanisms for informing the transmitter of the interference environment proximate to the receiver.

Therefore, communication on wireless channels, including mmW channels and/or unlicensed channels, may be improved by techniques and solutions for informing the transmitter of the interference environment relevant to the receiver, thereby allowing the transmitter to configure communication (e.g., initiate transmission) on a wireless channel according to the interference environment of the receiver. For example, some portions of LBT, CCA, eCCA, and/or other such contention-based procedures may be performed at the receiver side (e.g., UE), with the transmitter side (e.g., base station) configuring the duration for which the receiver is to detect interference (e.g., measure energy). By assigning some LBT, CCA, eCCA, etc. operations to the receiver side, greater interference protection may be provided to the receiver, and unnecessary back off time may be avoided (e.g., back off time may be reduced or eliminated).

Figure 4:
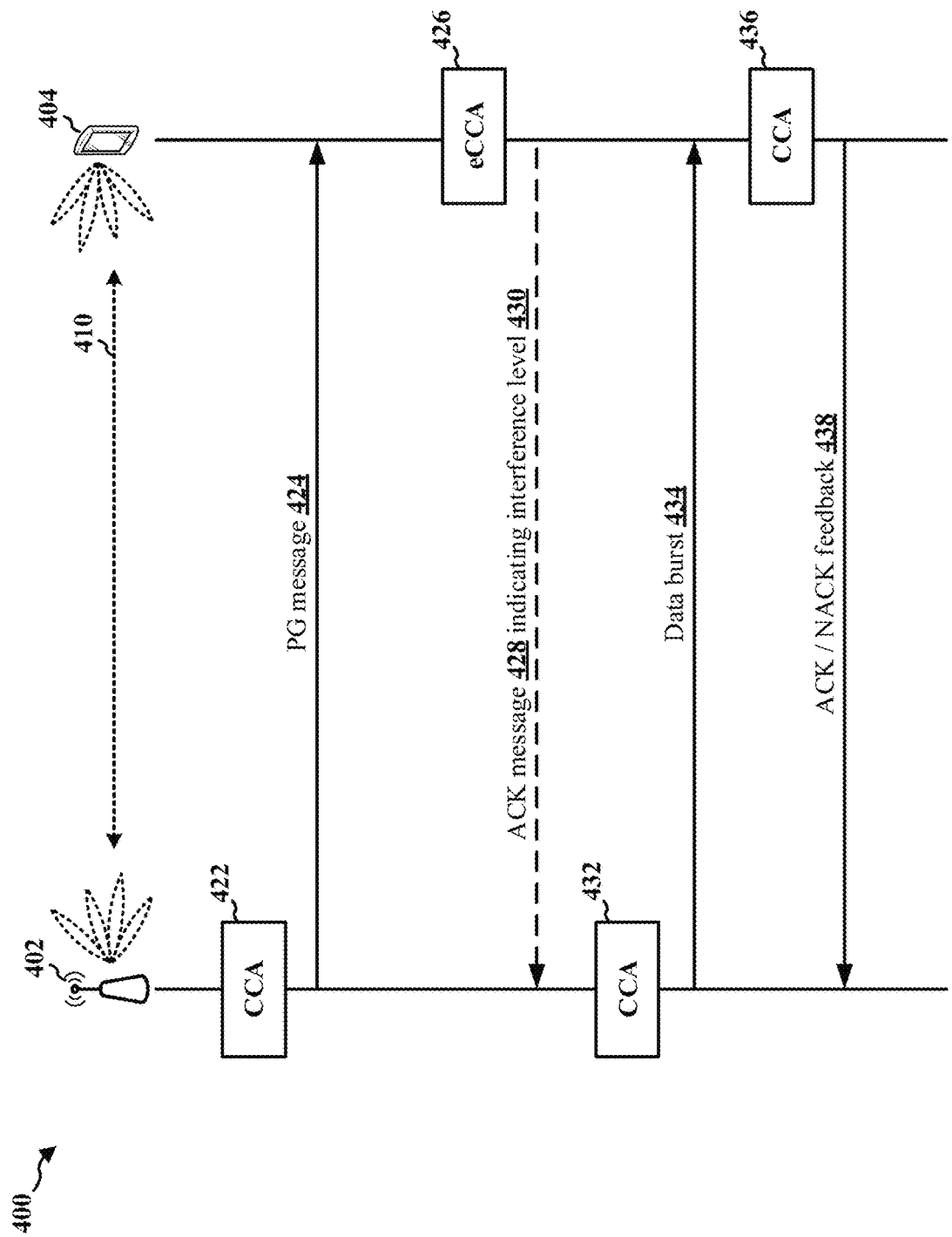
FIG. 4 is a call flow diagram illustrating an example wireless communications flow between a base station and a UE, in accordance with various aspects of the present disclosure.

FIG. 4 is a call flow diagram illustrating an example wireless communications flow 400 between a transmitter and a receiver on a wireless channel, in accordance with various aspects of the present disclosure. For example, the example wireless communications flow 400 may occur between a base station 402 and a UE 404 on a mmW link 410 configured on an unlicensed band (e.g., a 60 GHz band) and/or other wireless channel. In some example aspects, the base station 402 may be configured as the transmitter (e.g., of a data burst) and the UE 404 may be configured as the receiver on the mmW link 410.

According to some example communication protocols for communication on a wireless channel of an unlicensed band, when the UE 404 is receiving data (e.g., downlink data), the base station 402 performs a contention-based procedure to determine whether the wireless channel (or transmission medium) is "open." In other words, the base station 402 may detect for energy on resources on which the base station 402 intends to transmit to determine whether other transmissions are already occupying those resources. For example, the base station 402 may perform an LBT or CCA procedure in which the base station 402 measures energy on the wireless channel and compares the energy measurement to an ED threshold, with the ED threshold delineating the point below which the wireless channel is considered open (or clear) and above which the wireless channel is considered busy (or occupied).

If the base station 402 determines that the wireless channel is open based on the contention-based procedure, the base station 402 may transmit a downlink grant scheduling a downlink transmission to the UE 404. For example, the base station 402 may perform CCA 422 in order to determine whether the channel of the mmW link is open. Although the base station 402 may sense a clear channel from CCA 422 at the base station 402, the UE 404 may still experience interference, and thus, the UE 404 may not successfully receive the downlink grant and/or transmission from the base station 402.

In some aspects, the base station 402 may transmit a PG message 424 to the UE 404 to allow the UE 404 to confirm the receiver side channel is clear for reception. For example, the PG message 424 may trigger the UE 404 to perform some contention-based procedure so that the UE 404 may detect for interference on the wireless channel in the environment proximate to the UE 404. In contrast, contention-based procedures by the base station 402 may detect for interference on the wireless channel in the environment proximate to the base station 402, but may fail to adequately detect energy on the wireless channel proximate to the UE 404 that potentially may interfere with reception by the UE 404.

In some aspects, the PG message 424 may be a control signaling message, which may conveyed on a relatively small number of resources, such as two symbols in the time domain, which may increase the likelihood that the PG message 424 is received and successfully decoded by the UE 404 (e.g., should the UE 404 be in an environment with significant interference). The PG message 424 may trigger the UE 404 to perform some contention-based procedure, such as eCCA 426. To that end, the PG message 424 may indicate the duration of eCCA 426. For example, the duration of eCCA 426 may be longer than the duration of CCA 422. Potentially, the PG message 424 may also indicate a resource allocation for an ACK message 428 responsive to the PG message 424.

Based on receiving the PG message 424, the UE 404 performs eCCA 426, and the UE 404 may determine an interference level 430 from eCCA 426. During the duration of eCCA 426 (e.g., as configured by the PG message 424), the UE 404 may measure the energy (e.g., total energy in dBm) on the wireless channel on which the mmW link 410 is configured between the base station 402 and the UE 404. For example, the UE 404 may measure all energy on the wireless channel, regardless of the source, during eCCA 426.

In some aspects of eCCA 426, the UE 404 may compare the measured energy with an ED threshold, which may be configured according to one or more regulations and/or standards (e.g., 3GPP and/or 802.11 standards). For example, the UE 404 may be preconfigured with information indicating the ED threshold, such as a preconfigured value of −62 dBm or −72 dBm (although other values of the ED threshold are possible without departing from the scope of the present disclosure).

If the UE 404 determines that the measured energy satisfies (e.g., is greater than or equal to) the ED threshold, and thus the amount of interference on the wireless channel (e.g., including the mmW link 410) is high in the environment proximate to the UE 404, the UE 404 may refrain from transmitting the ACK message 428 in response to the PG message 424. By refraining from transmitting the ACK message 428 responsive to the PG message 424, the UE 404 may (implicitly) indicate, to the base station 402, that an interference level associated with the wireless channel proximate to the UE 404 is at least equal to the ED threshold (and potentially may be higher than the ED threshold).

The base station 402 may detect for the ACK message 428 responsive to the PG message 424, e.g., for a time period or window in which the ACK message 428 is expected to be received. For example, the base station 402 may detect for the ACK message 428 for the duration of a preconfigured timeout or countdown timer, which may be initiated based on transmission of the PG message 424. If the base station 402 fails to receive the ACK message 428 (e.g., before expiration of the timer), the base station 402 may refrain from transmitting a downlink data burst 434, as the wireless channel on which the mmW link 410 is configured may be busy or occupied in the environment proximate to the UE 404.

However, if the UE 404 determines that the measured energy fails to satisfy (e.g., is less than) the ED threshold, then the UE 404 may transmit the ACK message 428 to the base station 402 in response to the PG message 424. In some aspects, the ACK message 428 may be relatively small in size, and therefore, may be transmitted on a relatively small amount of resources. For example, the ACK message 428 may be transmitted on two symbols. However, the ACK message 428 may still be able to carry some information to the base station 402. For example, the ACK message 428 may include some control information (e.g., on a PUCCH) and/or payload (e.g., data) in which the UE 404 may insert some (limited amount) of control information and/or data. In some aspects, the base station 402 may configure the UE 404 to indicate an interference level in the ACK message 428, e.g., via RRC signaling, DCI, and/or MAC control element (CE).

Figure 5:
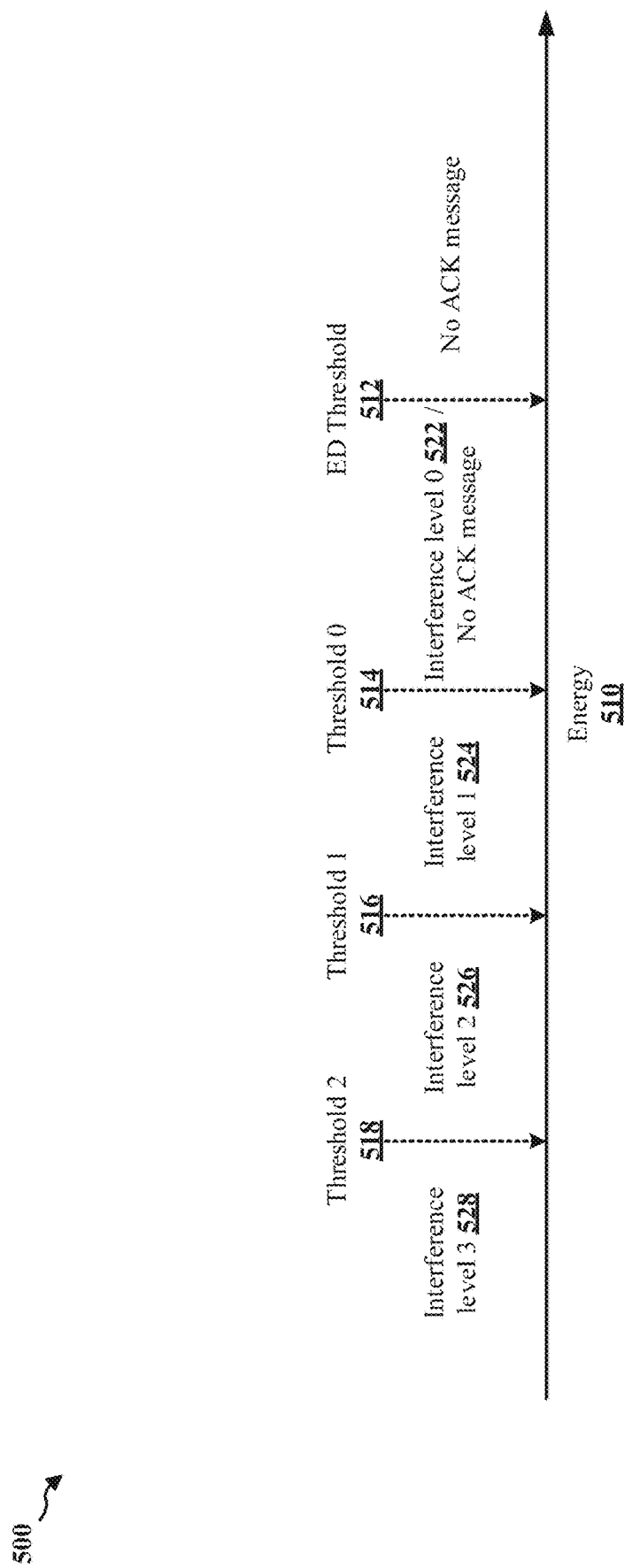
FIG. 5 is a diagram illustrating example thresholds configured for determination of interference levels associated with a wireless channel, in accordance with various aspects of the present disclosure.
Figure 6:
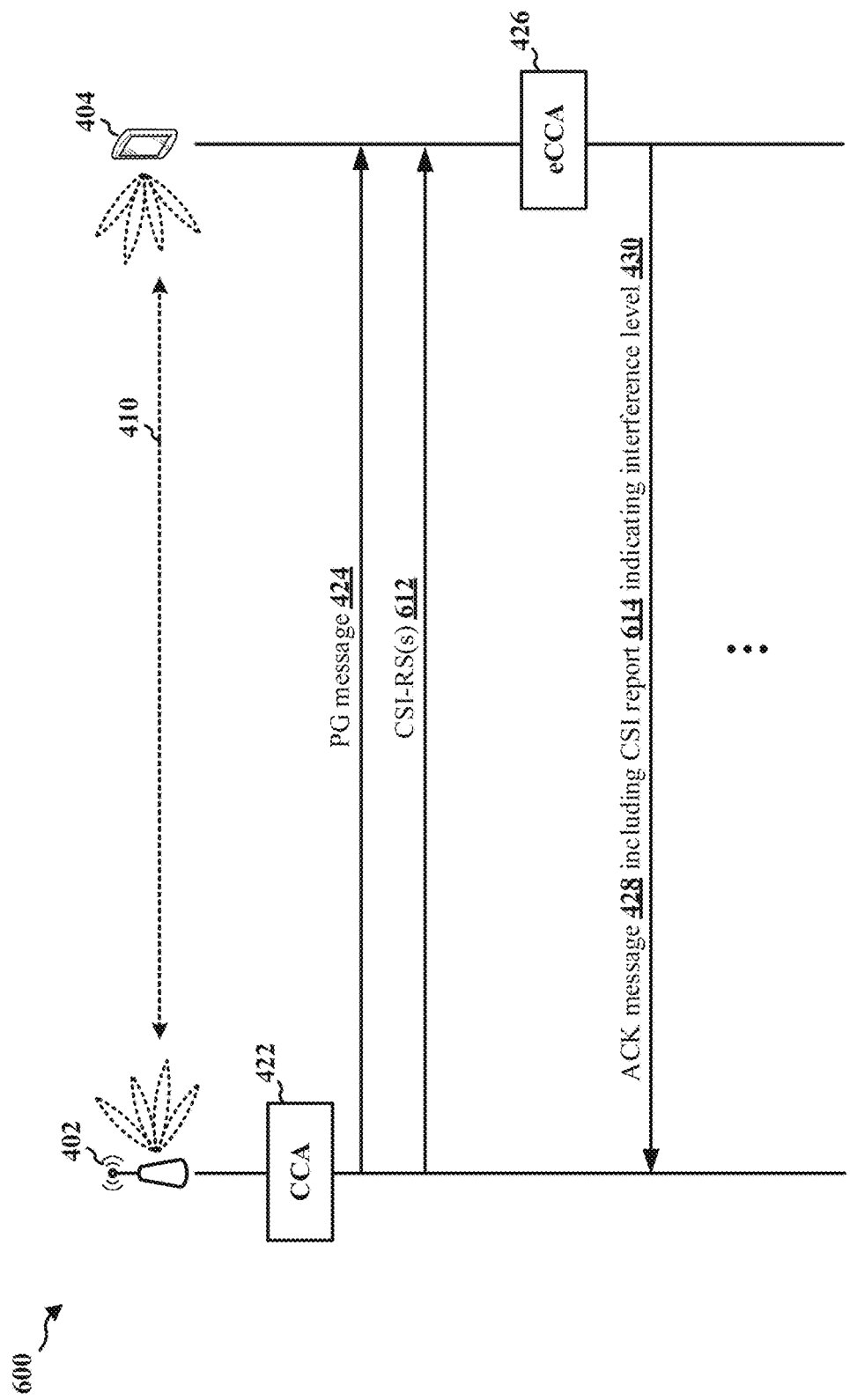
FIG. 6 is a call flow diagram illustrating another example wireless communications flow between a base station and a UE, in accordance with various aspects of the present disclosure.
Figure 7:
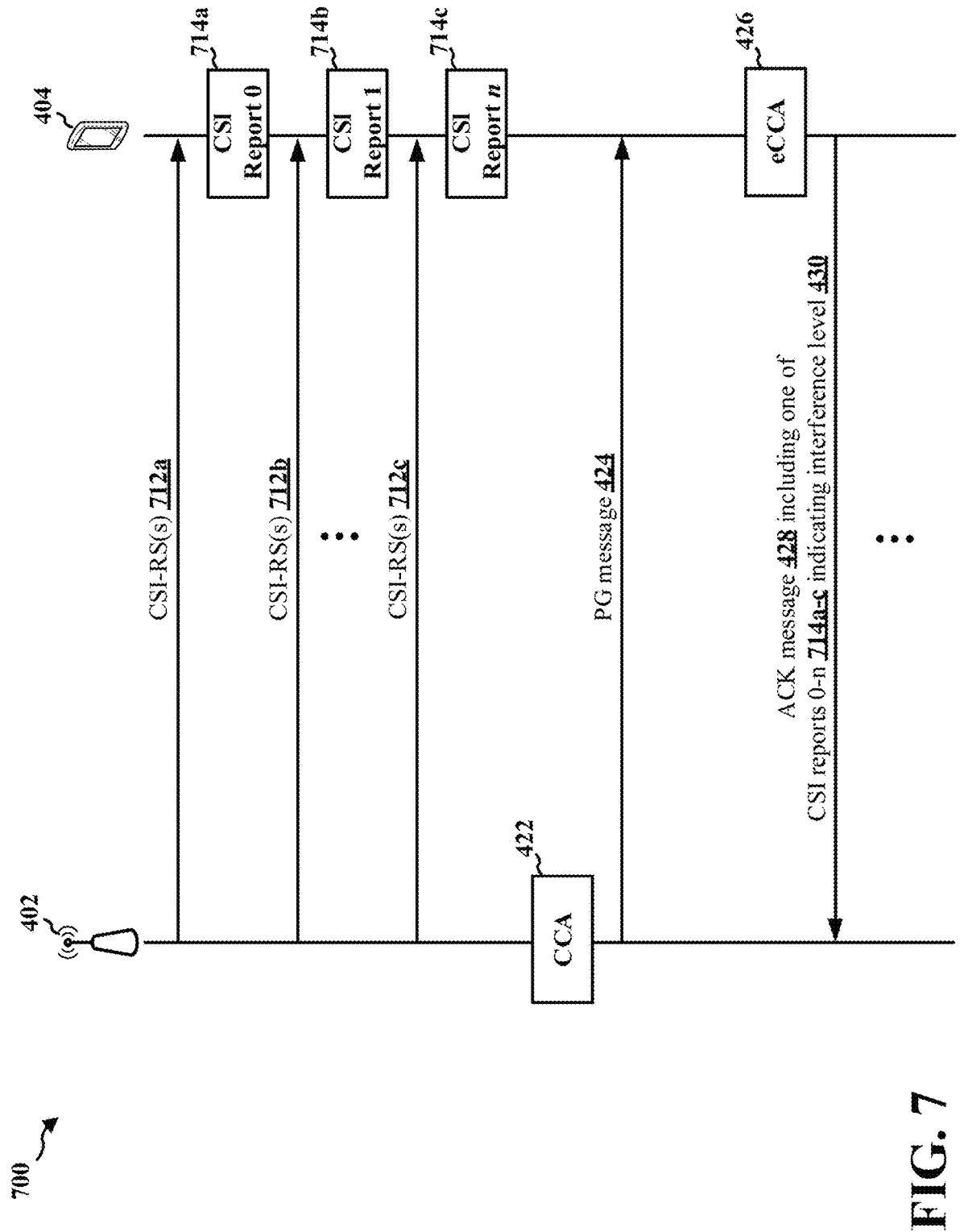
FIG. 7 is a call flow diagram illustrating a further example wireless communications flow between a base station and a UE, in accordance with various aspects of the present disclosure.

Thus, the UE 404 may indicate the determined interference level 430 in the ACK message 428. FIGS. 5-7, infra, illustrate various aspects of indicating the interference level 430 in the ACK message 428.

When the base station 402 receives the ACK message 428 from the UE 404, the base station 402 may configure the downlink data burst 434 based on the indicated interference level 430. In particular, the base station 402 may configure one or more transmission parameters for transmission of the data burst 434 based on the interference level 430. For example, the base station 402 may configure a modulation scheme, coding rate, modulation and coding scheme (MCS), transmission power, TB size, number of spatial streams or layers, precoder, and/or other parameter(s) for the downlink data burst 434 based on the interference level 430. Thus, the base station 402 may configure transmission of the data burst 434 in a manner that is suitable for the interference environment experienced by the UE 404, which may increase the probability of receiving and successfully decoding of the data burst 434 by the UE 404.

In some aspects, the base station 402 may perform a (additional) CCA 432 for the downlink data burst 434. If the base station 402 determines that the wireless channel on which the mmW link 410 is configured is open or unoccupied based on the CCA 432, the base station 402 may then transmit the downlink data burst 434, e.g., configured based on the interference level 430, to the UE 404.

The UE 404 may receive the downlink data burst 434, and may similarly perform another CCA 436 (e.g., in which a duration for measuring energy is less than eCCA 426). If the UE 404 determines that the wireless channel on which the mmW link 410 is configured is open or unoccupied from the CCA 436, the UE 404 may transmit ACK/NACK feedback 438 to the base station 402 in order to indicate whether the UE 404 successfully (as with ACK feedback) or unsuccessfully (as with NACK feedback) received and decoded the downlink data burst 434.

FIG. 5 is a diagram illustrating an example of thresholds 500 for determination of an interference level. During eCCA 426, the UE 404 may measure the energy 510 on the wireless channel on which the mmW link 410 is configured. For example, the UE 404 may measure the energy in each of a set of resources (e.g., symbols, slots, subframes, etc.) configured for the duration of the eCCA 426, and the UE 404 may use the largest energy measurement as the measured energy 510 to indicate the interference level 430 to the base station 402.

If the measured energy 510 is greater than the ED threshold 512, then the UE 404 may refrain from transmitting the ACK message 428. The absence of the ACK message 428 may function as an implicit indication to the base station 402 that the interference environment proximate to the UE 404 is high—e.g., an indication that the interference level associated with the wireless channel proximate to the UE 404 is at least equal to the ED threshold, and therefore, the wireless channel is busy or occupied.

However, if the measured energy 510 is less than the ED threshold, the UE 404 may compare the measured energy 510 with at least one threshold other than the ED threshold 512. For example, the UE 404 may compare the measured energy 510 with at least one of threshold 0 514, threshold 1 516, and/or threshold 2 518. The UE 404 may determine an interference level (e.g., a range of dBm values that includes the measured energy 510) according to which two of the thresholds 512, 514, 516, 518, the measured energy 510 falls between.

The UE 404 may then configure the ACK message 428 (e.g., with a PUCCH waveform) to indicate the interference level 430 as the one of the interference levels 522, 524, 526, 528. For example, the UE 404 may quantize the measured energy 510, and the quantized measured energy may be used to indicate the interference level 430. The UE 404 may quantize the measured energy 510 based on comparison of the measured energy 510 with at least one of the thresholds 514, 516, 518 and/or the ED threshold 512.

For example, if the UE 404 determines that the measured energy is less than the ED threshold 512 and greater than threshold 0 514, then the UE 404 may quantize the measured energy 510 to indicate the wireless channel is relatively busy and/or the interference proximate to the UE 404 is relatively high—e.g., the UE 404 may configure the ACK message 428 to indicate interference level 0 522, which may be a value corresponding to "high interference" and/or a range between threshold 0 514 and the ED threshold 512. In some aspects, threshold 0 514 may be more conservative than the ED threshold 512, and therefore, the UE 404 may refrain from transmitting the ACK message 428 if the measured energy 510 is greater than threshold 0 514, which may indicate to the base station 402 that the interference proximate to the UE 404 on the wireless channel on which the mmW link 410 is configured is likely too significant for the UE 404 to receive and successfully decode the downlink data burst 434.

In another example, if the UE 404 determines that the measured energy 510 is less than threshold 0 514 and greater than threshold 1 516, then the UE 404 may quantize the measured energy 510 to indicate the wireless channel includes some interference and/or the interference proximate to the UE 404 is "medium"—e.g., the UE 404 may configure the ACK message 428 to indicate interference level 1 524, which may be a value corresponding to "medium" interference and/or a range between threshold 1 516 and threshold 0 514.

Similarly, if the UE 404 determines that the measured energy 510 is less than threshold 1 516 and greater than threshold 2 518, the UE 404 may quantize the measured energy 510 to indicate a relatively low amount of interference on the wireless channel proximate to the UE 404. For example, the UE 404 may configure the ACK message 428 to indicate interference level 2 526, which may indicate a value corresponding to "low" interference and/or a range between threshold 2 518 and threshold 1 516.

If the UE 404 determines that the measured energy 510 is less than threshold 2 518, the UE 404 may quantize the measured energy 510 to indicate that the wireless channel proximate to the UE 404 includes no or a very low amount of interference. For example, the UE 404 may configure the ACK message 428 to indicate interference level 3 528. Illustratively, the interference level 3 528 may include a value corresponding to "no" or "very low" interference on the wireless channel proximate to the UE 404 and/or a ceiling indicating the (approximate) maximum amount of interference detected proximate to the UE 404 (e.g., a low ceiling amount that the measured energy 510 does not exceed).

In one aspect, the base station 402 may configure one or more of the thresholds 514, 516, 518 for the UE 404, such as by transmitting information indicating dBm values for each of the thresholds 514, 516, 518 to the UE 404 via at least one of RRC signaling, DCI, and/or MAC CE. In another aspect, one or more of the thresholds 514, 516, 518 may be preconfigured in the UE 404, such as when the thresholds 514, 516, 518 are set by a standard (e.g., 3GPP and/or 802.11 standards).

In a further aspect, a single threshold (more conservative than the ED threshold 512) may be configured, and the UE 404 may transmit the ACK message 428 only when the measured energy 510 is below that single threshold. Accordingly, the UE 404 may implicitly indicate that the interference level associated with the wireless channel proximate to the UE 404 is at least the single threshold when the UE 404 refrains from transmitting the ACK message 428 responsive to the PG message 424. Correspondingly, the UE 404 may (implicitly) indicate that the interference level associated with the wireless channel proximate to the UE 404 is at most the single threshold when the UE 404 transmits the ACK message 428 responsive to the PG message 424.

FIG. 6 is a call flow diagram illustrating an example wireless communications flow 600 between the base station 402 and the UE 404 on the mmW link 410 configured on a wireless channel (e.g., an unlicensed band). In FIG. 6, the UE 404 may indicate the interference level 430 in the ACK message 428, and the ACK message 428 may include at least one CSI report 614.

The at least one CSI report 614 may be based on a set of RSs received by the UE 404 from the base station 402. For example, the base station 402 may transmit a set of CSI-RSs 612 to the UE 404. The CSI-RSs 612 may be carried on a set of resources that at least partially overlaps with the resource(s) on which the PG message 424 is carried. For example, the set of CSI-RSs 612 may be carried on one or more resources at least partially overlapping in time with one or more resources on which the PG message 424 is carried. In other words, the base station 402 may transmit, and the UE 404 may receive, the PG message 424 contemporaneously with the set of CSI-RSs 612.

In some aspects, the UE 404 may be configured for at least one of aperiodic and/or semi-persistent CSI reporting, in which case the UE 404 may transmit the at least one CSI report 614 in response to receiving a trigger from the base station 402. For example, the base station 402 may trigger the UE 404 for aperiodic or semi-persistent CSI reporting using the PG message 424, such as by setting a field of the PG message 424 and/or a DCI message (e.g., a DCI message associated with the PG message 424).

The UE 404 may determine the interference level 430 by using at least one of the set of CSI-RSs 612. For example, at least one resource carrying at least one of the set of CSI-RSs 612 may be configured as an interference measurement resource (IMR), and the UE 404 may be configured to measure energy on the wireless channel in the IMR. Alternatively or additionally, the UE 404 may be configured to measure energy on the wireless channel on which the mmW link 410 is configured during eCCA 426 (e.g., eCCA 426 may be performed based on the PG message 424).

Based on receiving the set of CSI-RSs 612, the UE 404 may generate at least one CSI report 614—e.g., the UE 404 may generate at least one of a CQI, RI, PMI, layer indicator (LI), and/or other information associated with CSI based on receiving the set of CSI-RSs 612. Potentially, generation of a CSI report may consume some time of the eCCA 426 duration. Therefore, the UE 404 may generate the at least one CSI report 614 as at least one of a fast CSI report and/or short CSI report, e.g., in which the UE 404 performs some fast and/or short CSI computation(s), such as fast and/or short CSI computations in which the number of sub-bands for which CSI is computed is limited, the PMI computation(s) is reduced, the rank is limited, and/or other CSI limitation(s).

If at least one resource carry the set of CSI-RSs 612 is used as an IMR, then the UE 404 may use a beginning portion (e.g., the first symbol, first slot, and/or first sub-frame) of the eCCA 426 duration to determine the interference level 430. The UE 404 may then use the remainder of the eCCA 426 duration to generate the at least CSI report 614, e.g., including CSI computation(s) for one or more of CQI, PMI, RI, and/or LI, which may be reduced or limited.

The UE 404 may include the at least one CSI report 614 in the ACK message 428 (e.g., in a payload, as control information on a PUCCH, etc.) transmitted to the base station 402 responsive to the PG message 424. Accordingly, the base station 402 may receive the ACK message 428 including the at least one CSI report 614. In some aspects, the at least one CSI report 614 may function as the indication of the interference level 430 associated with the wireless channel proximate to the UE 404.

At the base station 402, processing the CSI report 614 may consume some time at the base station 402, e.g., during which the base station 402 may have already configured some portion of the data burst 434 for transmission. Thus, the base station 402 may be unable to configure transmission parameters for the full data burst 434 based on the at least one CSI report 614. However, the base station 402 may be able to configure transmission parameters to apply to at least a portion of the downlink data burst 434 based on the at least one CSI report 614. For example, the base station 402 may adjust some transmission parameters for a second (later) portion of the data burst 434, such as by updating a coding rate, modulation scheme, MCS, and/or other transmission parameters for the data burst 434 after the base station 402 processes the at least one CSI report 614.

FIG. 7 is a call flow diagram illustrating a further example wireless communications flow 700 between the base station 402 and the UE 404 on the wireless channel on which the mmW link 410 is configured. In FIG. 7, the UE 404 may indicate the interference level 430 in the ACK message 428 as one of a plurality of CSI reports 0-n 714a-c. Each of the plurality of CSI reports 0-n 714a-c may be generated prior to reception of the PG message 424, and each may be associated with a respective spatial signature corresponding to a respective interference pattern on the wireless channel proximate to the UE 404.

In order to generate the plurality of CSI reports 0-n 714a-c prior to reception of the PG message 424, the base station 402 may transmit a plurality of sets of CSI-RSs 712a-c to the UE 404 prior to transmission of the PG message 424. For each of the plurality of sets of CSI-RSs 712a-c received by the UE 404, the UE 404 may generate a corresponding one of the plurality of CSI reports 0-n 714a-c. For example, the UE 404 may generate one or more of a CQI, PMI, RI, and/or LI for each of the CSI reports 0-n 714a-c based on receiving a respective one of the sets of CSI-RSs 712a-c.

Often, the UE 404 may observe a discrete number (e.g., one, two, three, etc.) of dominant interferers over a period of time, each of which may be a largest source of interference proximate to the UE 404 at one time. For example, a neighboring base station, another UE, or other transmitter on the wireless channel may be a dominant interferer at any one time in the environment proximate to the UE 404. Different interferers may result in different computations of CSI (e.g., CQI) and/or different energy measurements by the UE 404 at different times. Thus, the UE 404 may observe respective spatial signatures corresponding to different interference patterns generated by different dominant interferers at various times, e.g., when the UE 404 is receiving the sets of CSI-RSs 712a-c and generating the CSI reports 0-n 714a-c based thereon.

In order for the UE 404 to compute each CSI (e.g., each CQI) at a respective time with a respective spatial signature associated therewith, the base station 402 may differently configure each of the sets of CSI-RS 712a-c for transmission to the UE 404 at a respective time. For example, the base station 402 may configure each of the sets of CSI-RSs 712a-c for channel measurement by the UE 404. When the UE 404 then receives each of the sets of CSI-RSs 712a-c, the UE 404 may determine a respective interference structure as the UE 404 performs channel measurement and computes CSI. The UE 404 may associate each of the CSI reports 0-n 714a-c with a respective spatial signature based on the respective interference structure determined by the UE 404 based on receiving a respective one of the sets of CSI-RSs 712a-c.

Illustratively, the UE 404 may receive the first set of CSI-RSs 712a at time 0. Based on the first set of CSI-RS 712a, the UE 404 may generate a CSI report 0 714a. The UE 404 may determine a first spatial signature observed at the UE 404 at the time 0, such as when the UE computes CSI and/or performs channel measurement. For example, the UE 404 may determine the first spatial signature as a corresponding (or contemporaneous) interference pattern or other interference structure introduced on the wireless channel by a dominant interferer at time 0. The UE 404 may then store the CSI report 0 714a, and may associate the CSI report 0 714a with the first spatial signature at time 0.

Similarly, the UE 404 may receive the second set of CSI-RSs 712b at time 1. Based on the second set of CSI-RSs 712b, the UE 404 may generate a CSI report 1 714b. Similar to time 0, the UE 404 may determine a second spatial signature observed at the UE 404 at the time 1, such as when the UE computes CSI and/or performs channel measurement based on the second set of CSI-RSs 712b at time 1. For example, the UE 404 may determine the second spatial signature as a corresponding (or contemporaneous) interference pattern or other interference structure introduced on the wireless channel by a dominant interferer at time 1, which may be different than the dominant interfere at time 0, and therefore, may introduce a different interference pattern on the wireless channel at time 1. Accordingly, the UE 404 may store the CSI report 1 714b in association with the second spatial signature observed at time 1.

The UE 404 may continue this process until time n, when the UE 404 receives the $n^{th}$ set of CSI-RSs 712c at time n. Based on the $n^{th}$ set of CSI-RS 712c, the UE 404 may generate a CSI report n 714c. Further, the UE 404 may determine an $n^{th}$ spatial signature observed at the UE 404 at the time n, e.g., based on a corresponding (or contemporaneous) interference pattern or other interference structure introduced on the wireless channel by another dominant interferer at time n. The UE 404 may then store the CSI report n 714c in association with the $n^{th}$ spatial signature at time n.

With the plurality of CSI reports 0-n 714a-c being respectively associated with spatial signatures, the UE 404 may be able to determine which of the CSI reports 0-n 714a-c is applicable to a current (or contemporaneous) interference environment proximate to the UE 404 when the UE 404 receives the PG message 424 in advance of a data burst. Thus, the UE 404 may be able to select one of the CSI reports 0-n 714a-c that is applicable to current interference environment based on comparison of spatial signatures, which may reduce CSI reporting time by the UE 404 as the UE 404 has already generated the CSI report with information corresponding to the current interference experienced by the UE 404 on the wireless channel.

In some aspects, the UE 404 may be configured for at least one of aperiodic and/or semi-persistent CSI reporting, in which case the UE 404 may transmit at least one of the CSI reports 0-n 714a-c in response to receiving a trigger from the base station 402. For example, the base station 402 may trigger the UE 404 for aperiodic or semi-persistent CSI reporting using the PG message 424, such as by setting a field of the PG message 424 and/or a DCI message (e.g., a DCI message associated with the PG message 424).

In some aspects, the UE 404 may use at least a portion of the duration of the eCCA 426 configured for energy measurement as at least one IMR, and therefore, the measured energy on the wireless channel on which the mmW link 410 is configured may be used as the result of an IMR. During eCCA 426, the UE 404 may determine the current or contemporaneous spatial signature (e.g., corresponding to the current or contemporaneous interference pattern or other interference structure) observed at the UE 404 as a result of a current one of the dominant interferers. That is, when the UE 404 is triggered for eCCA 426 by the PG message 424, the UE 404 may determine the current spatial signature, e.g., caused by one of the dominant interferers transmitting at the current time contemporaneous with eCCA 426.

The UE 404 may then determine which of the stored spatial signatures (e.g., spatial signatures 0 through n) matches the current spatial signature, e.g., as determined during eCCA 426 performed in response to receiving the PG message 424. Specifically, the UE 404 may compare the current spatial signatures with one or more of the stored (first through $n^{th}$) spatial signatures to determine which of the first through $n^{th}$ spatial signatures matches the current spatial signature. Potentially, the UE 404 may determine that one of the first $n^{th}$ spatial signatures most closely matches the current spatial signature, e.g., within a margin of error.

Once the UE 404 determines which of the stored first through $n^{th}$ spatial signatures matches the current spatial signature, the UE 404 may select the one of the previously generated CSI reports 0-n 714a-c that is associated with the stored spatial signature determined to match the current spatial signature. For example, if the UE 404 determines that the second spatial signature matches the current spatial signature observed during the eCCA 426, then the UE 404 may select the CSI report 1 714b that is associated with the second spatial signature.

The UE 404 may then transmit, to the base station 402, the ACK message 428 with one of the previously generated CSI reports 0-n 714a-c associated with the one of the spatial signatures determined to (most closely) match the current spatial signature. In some aspects, the UE 404 may use the one of the previously generated CSI reports 0-n 714a-c, included in the ACK message 428 based on the matching spatial signatures, to indicate the interference level 430 to the base station 402. For example, the UE 404 may transmit, to the base station 402, the selected CSI report 1 714b to indicate the interference level 430 associated with the wireless channel proximate to the UE 404 based on the second spatial signature matching the current spatial signature observed during eCCA 426.

According to some aspects, the UE 404 may include information indicating the associated spatial structure in the ACK message 428 including one of the CSI reports 0-n 714a-c. For example, if the UE 404 includes the CSI report 1 714b in the ACK message 428, the UE 404 may further include information indicating the second spatial structure associated with the CSI report 1 714b in the ACK message 428. Such information may indicate the interference environment proximate to the UE 404 (e.g., may indicate the interference level 430), and therefore, the base station 402 may configure transmission parameters for at least a portion of the data burst based on the one of the CSI reports 0-n 714a-c included in the ACK message 428 with the associated spatial structure.

In some further aspects, the UE 404 may transmit each of the CSI reports 0-n 714a-c to the base station 402 at some time in advance of receiving the PG message 424. When the UE 404 receives the PG message 424, the UE 404 may include information in the ACK message 428 indicating which of the earlier reported CSI reports 0-n 714a-c is applicable to the current interference environment proximate to the UE 404. For example, the UE 404 may include an index or other identifier that indicates to the base station 402 which of the earlier reported CSI reports 0-n 714a-c is to be used. The base station 402 may then determine which of the earlier reported CSI reports 0-n 714a-c is identified by the UE 404 in the ACK message 428, and the base station 402 may use that determined one of the earlier reported CSI reports 0-n 714a-c to configure transmission parameters for at least a portion of the data burst 434.

In yet other aspects, the base station 402 may configure at least one of the sets of CSI-RSs 712a-c for channel measurement by the UE 404, and multiple CSI may be reported for that at least one set. That is, the UE 404 may determine each of multiple CSI for the at least one of the sets of CSI-RSs 712a-c according to a respective interference pattern, e.g., so that each CSI for one set of CSI-RSs is associated with a different spatial signature corresponding to a different interferer on the wireless channel at the time of CSI computation. Each of the multiple CSI may be stored in association with the respective spatial signature.

Figure 8:
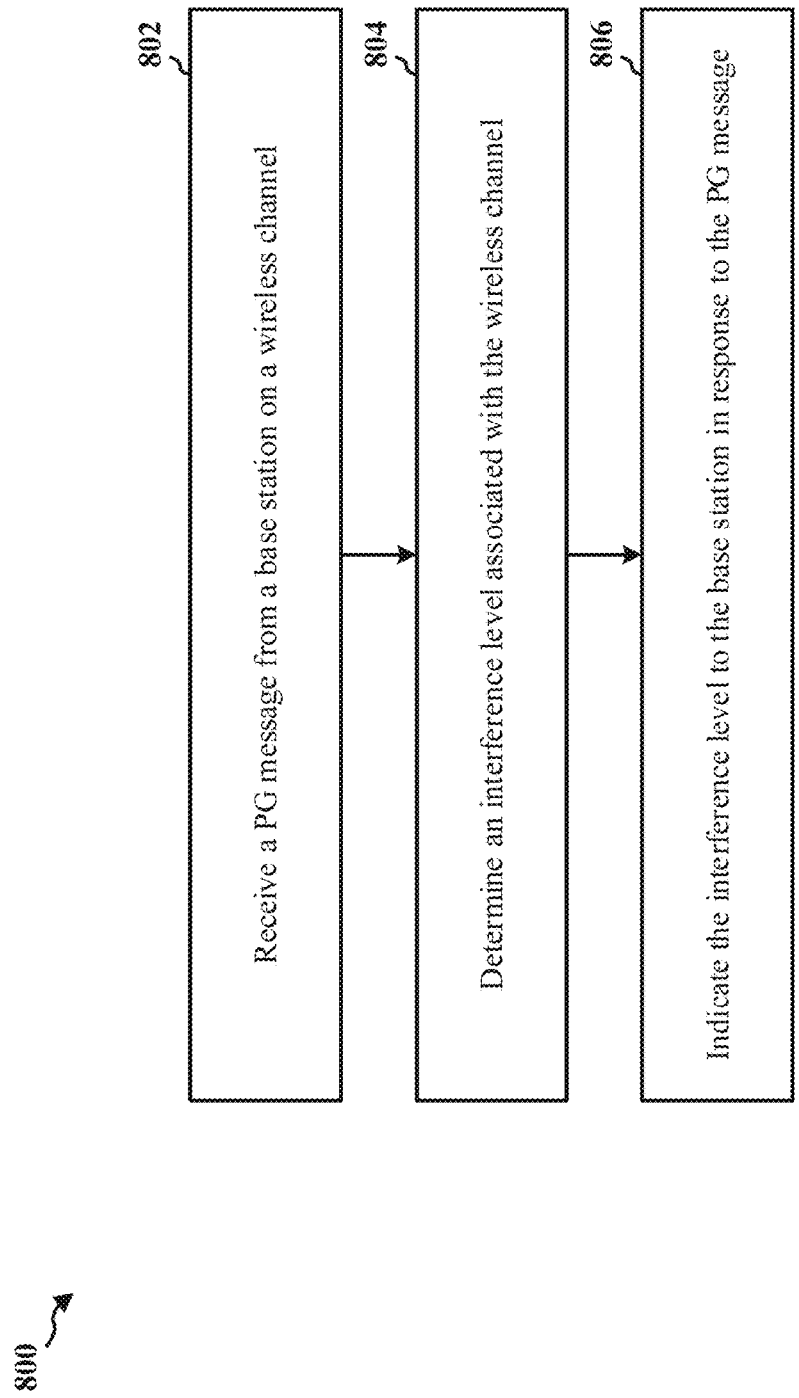
FIG. 8 is a flowchart of an example method of wireless communication by a UE, in accordance with various aspects of the present disclosure.

FIG. 8 is a flowchart of a method 800 of wireless communication. The method 800 may be performed by a UE (e.g., the UE 104, 350, 404, which may include the memory 360 and which may be the entire UE 104, 350, 404, or a component of the UE 104, 350, 404, such as the TX processor 368, the RX processor 356, and/or the controller/processor 359) and/or apparatus (e.g., the apparatus 1202). According to different aspects of the method 800, one or more of the illustrated operations may be omitted, transposed, and/or contemporaneously performed.

At 802, the UE may receive a PG message from a base station on a wireless channel. For example, the wireless channel may be in an unlicensed band.

Referring to 802 in the context of FIG. 4, the UE 404 may receive the PG message 424 from the base station 402 on the wireless channel on which the mmW link 410 is configured.

At 804, the UE may determine an interference level associated with the wireless channel. For example, the UE may determine the interference level in a duration associated with one of CCA or eCCA.

Referring to 804 in the context of FIG. 4, the UE 404 may determine the interference level 430 associated with the wireless channel on which the mmW link 410 is configured, e.g., during eCCA 426.

At 806, the UE may indicate the interference level to the base station in response to the PG message. In some aspects, the UE may indicate the interference level to the base station by determining that the measured energy on the wireless channel satisfies an ED threshold, and then refraining from transmitting an ACK message responsive to the PG message when the measured energy on the wireless channel satisfies the ED threshold. The absence of the ACK message may indicate the interference level on the wireless channel proximate to the UE is high and/or may indicate that the wireless channel is busy or occupied. In some other aspects, the UE may indicate the interference level to the base station by transmitting an ACK message responsive to the PG message to the base station, and the ACK message may include information indicating the interference level associated with the wireless channel proximate to the UE.

Referring to 806 in the context of FIG. 4, the UE 404 may indicate the interference level 430 to the base station 402 in response to the PG message 424, such as by refraining from transmitting the ACK message 428 to the base station 402 when the wireless channel is busy or occupied or by transmitting the ACK message 428 responsive to the PG message 424 to the base station 402 with information indicating the interference level 430 included in the ACK message 428.

Figure 9:
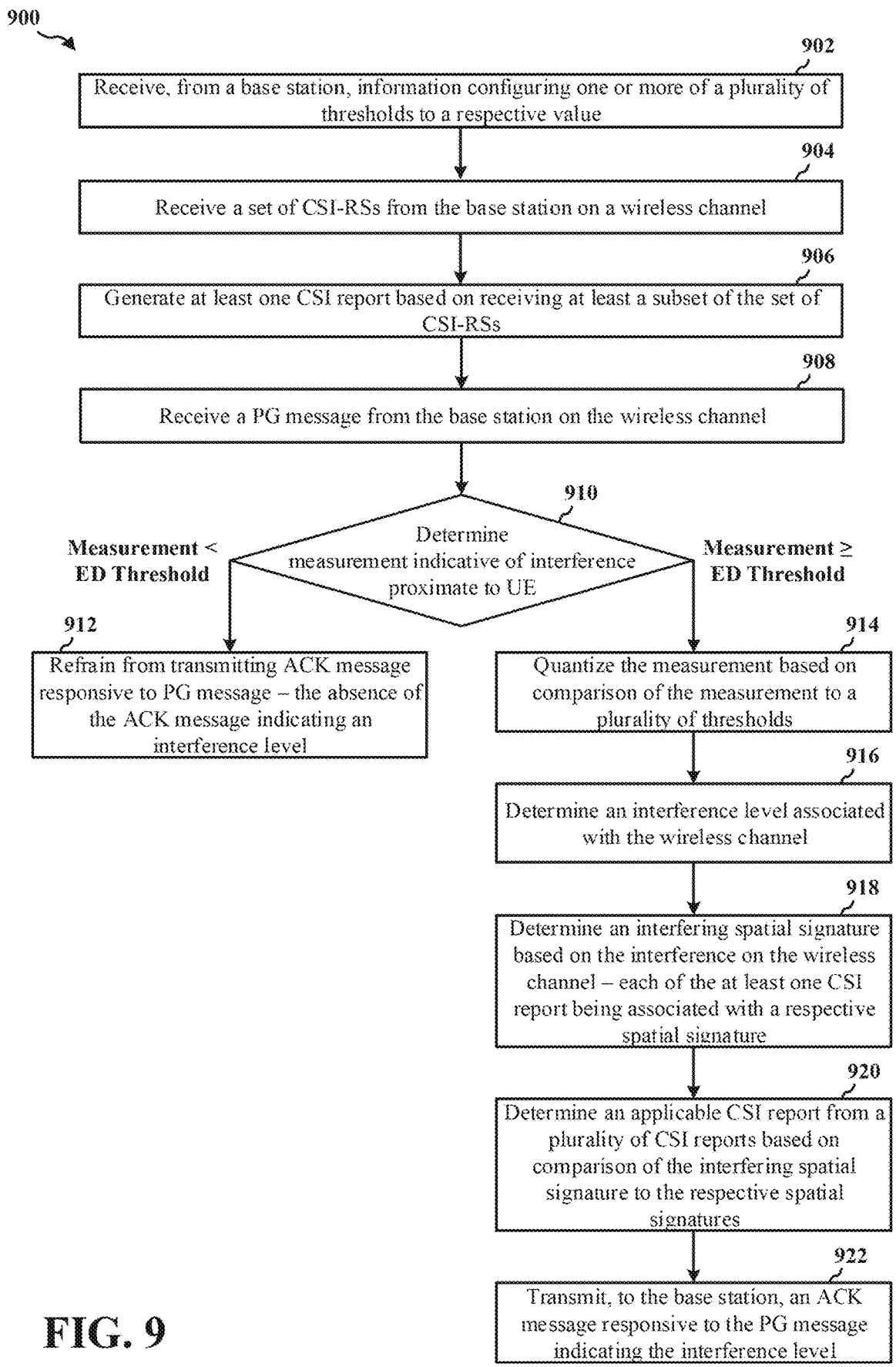
FIG. 9 is a flowchart of another example method of wireless communication by a UE, in accordance with various aspects of the present disclosure.

FIG. 9 is a flowchart of a method 900 of wireless communication. The method 900 may be performed by a UE (e.g., the UE 104, 350, 404, which may include the memory 360 and which may be the entire UE 104, 350, 404, or a component of the UE 104, 350, 404, such as the TX processor 368, the RX processor 356, and/or the controller/processor 359) and/or apparatus (e.g., the apparatus 1202). According to different aspects of the method 900, one or more of the illustrated operations may be omitted, transposed, and/or contemporaneously performed.

At 902, the UE may receive, from a base station, information configuring one or more of a plurality of thresholds to a respective value. For example, each of the plurality of thresholds may be a value (e.g., in dBm) associated with measuring energy on a wireless channel in an environment proximate to the UE. The information may configure one or more of a plurality of thresholds that is different from an ED threshold—e.g., an ED threshold may be set (e.g., preconfigured) according to one or more protocols and/or standards, such as one or more protocols and/or standards promulgated by IEEE and/or 3GPP.

Referring to 902 in the context of FIGS. 4-7, the UE 404 may receive, from the base station 402, information configuring one or more of threshold 0 514, threshold 1 516, and/or threshold 2 518 to a respective value, such as a dBm value.

At 904, the UE may receive a set of CSI-RSs from the base station on a wireless channel. In some aspects, the UE may receive the set of CSI-RSs in one time period. For example, the set of CSI-RSs may be received on a set of resources that are included in one slot or one subframe. In another example, the set of CSI-RSs may be received on a set of resources associated with the same downlink burst. In some other aspects, the UE may receive the set of CSI-RSs over multiple different time periods. For example, the set of CSI-RSs may include a plurality of subsets of CSI-RSs, and the UE may receive each of the plurality of subsets of CSI-RSs on a respective set of resources (e.g., a slot and/or subframe) at a respective time of a plurality of different times (e.g., time 0, time 1, . . . , time n).

In some aspects, at least one resource of the set of resources on which the set of CSI-RSs is received may be configured as an IMR (e.g., based on information received from the base station). In some other aspects, at least one subset of the set of CSI-RSs is configured for channel measurement (e.g., according to information received from the base station)—e.g., at least one resource of the at least one subset of the set of CSI-RSs configured for channel measurement may be used by the UE as an IMR, such as at least one resource on which the UE measures energy on the wireless channel.

Referring to 904 in the context of FIGS. 4 and 6, the UE 404 may receive the set of CSI-RSs 612 from the base station 402 on the wireless channel on which the mmW link 410 is configured. In the context of FIGS. 4 and 7, the UE 404 may receive each of the sets of CSI-RSs 712a-c from the base station 402 on the wireless channel on which the mmW link 410 is configured.

At 906, the UE may generate at least one CSI report based on receiving at least a subset of the set of CSI-RSs. Potentially, the at least one CSI report may be a short CSI report and/or fast CSI report, e.g., based on short CSI computation and/or fast CSI computation, such as when one or more CSI parameters is computed over a reduced or limited bandwidth and/or number of sub-bands. In some aspects, the UE may generate one CSI report based on receiving at least one CSI-RS of the set of CSI-RSs. For example, the UE may measure at least one of reference signal received power (RSRP), signal-to-interference-plus-noise ratio (SINR), and/or another value indicative of the quality of the wireless channel, and then the UE may compute (e.g., calculate) at least one of CQI, RI, PMI, and/or LI based on the measured at least one of RSRP, SINR, and/or other value.

In some other aspects, the UE may generate a plurality of CSI reports based on receiving at least a subset of the set of CSI-RSs. For example, the UE may generate each of the plurality of CSI reports based on receiving a respective subset of the set of CSI-RSs over a respective time period of multiple different time periods. In some aspects, the UE may determine a plurality of spatial signatures based on a respective interference measurement determined from a respective subset of the set of CSI-RSs. For example, the UE may determine a spatial signature corresponding to an interference pattern detected by the UE on the wireless channel when receiving each of the subsets of the set of CSI-RSs, and the UE may associated each of the spatial signatures with a respective one of the plurality of CSI reports generated at a respective time of the plurality of time periods over which the set of CSI-RSs is received.

Referring to 906 in the context of FIGS. 4 and 6, the UE 404 may generate the at least one CSI report 614 based on receiving at least one of the set of CSI-RSs 612 from the base station 402 on the wireless channel on which the mmW link 410 is configured. In the context of FIGS. 4 and 7, the UE 404 may generate each of the CSI reports 0-n 714a-c based on receiving a respective one of the sets of CSI-RSs 712a-c from the base station 402 on the wireless channel on which the mmW link 410 is configured.

At 908, the UE may receive a PG message from the base station on the wireless channel. For example, the PG message may be a relatively short and/or small (in size) message, e.g., carried on two symbols, which may trigger a contention-based procedure (e.g., an eCCA procedure) by the UE. In some aspects, the PG message may include a duration for which energy on the wireless channel is to be measured for the contention-based procedure (e.g., eCCA). In some other aspects, the PG message may include information indicating a set of resources on which an ACK message responsive to the PG message is to be carried.

In some aspects, the UE may receive the PG message on a set of resources at least partially overlapping with the set of resources carrying at least one of the set of CSI-RSs. In some other aspects, the UE may receive the PG message after receiving the set of CSI-RSs. In some further aspects, the PG message may trigger CSI reporting by the UE—e.g., the PG message may trigger the UE for aperiodic CSI reporting or semi-persistent CSI reporting.

Referring to 908 in the context of FIGS. 4, 6, and 7, the UE 404 may receive the PG message 424 from the base station 402 on the wireless channel on which the mmW link 410 is configured.

At 910, the UE may determine a measurement indicative of interference proximate to the UE on the wireless channel. For example, the UE may perform a CCA or eCCA procedure in which the UE detects for energy on the wireless channel, e.g., for a duration associated with the CCA or eCCA procedure and/or on an IMR, and the UE measures (total) energy on the wireless channel based on the detection. The UE may measure the energy on the wireless channel in dBm. In some aspects, the UE may determine a current spatial signature corresponding to an interference pattern on the wireless channel in the environment proximate to the UE—e.g., the current spatial signature may correspond to an interference pattern caused by transmission from a dominant interferer (e.g., neighboring base station, other UE, other wireless communications device, etc.).

In some aspects, the UE may compare the determined measurement to at least one threshold, such as an ED threshold. Based on the comparison, the UE may determine whether the determined measurement satisfies the at least one threshold. For example, if the UE determines that the measurement is greater than or equal to the at least one threshold based on the comparison, then the UE may determine that the measurement satisfies the at least one threshold, and therefore, the UE may determine that the wireless channel is busy or occupied. However, if the UE determines that the measurement is less than the at least one threshold based on the comparison, then the UE may determine that the measurement fails to satisfy the at least one threshold, and therefore, the UE may determine that the wireless channel is open or unoccupied.

Referring to 910 in the context of FIGS. 4-7, the UE 404 may perform eCCA 426 in order to measure the (total) energy on the wireless channel on which the mmW link 410 is configured in the environment proximate to the UE 404. For example, the UE 404 may determine whether the measured energy 510 satisfies the ED threshold 512.

If, at 910, the UE determines that the measurement fails to satisfy (e.g., is less than) the at least one threshold (e.g., the ED threshold), then:

At 912, the UE may refrain from transmitting an ACK message responsive to the PG message to the base station on the wireless channel. The UE may determine that the measured energy on the wireless channel indicates that the wireless channel is busy or occupied, and so the UE would likely experience interference on the wireless channel proximate to the UE when receiving data from the base station, which may prevent the UE from receiving and/or successfully decoding the data. Therefore, the UE may indicate, to the base station, that the floor of an interference level associated with the wireless channel proximate to the UE is equal to the at least one threshold (e.g., ED threshold) by refraining from acknowledging the PG message 424 and not transmitting an ACK message responsive to the PG message. The absence of the ACK message responsive to the PG message may indicate, to the base station, that the interference level is relatively high and the wireless channel is busy or occupied.

Referring to 912 in the context of FIGS. 4-7, the UE 404 may refrain from transmitting, to the base station 402, the ACK message 428 responsive to the PG message 424 on the wireless channel on which the mmW link 410 is configured. The absence of the ACK message 428 responsive to the PG message 424 may indicate that the wireless channel proximate to the UE 404 is busy or occupied.

If, at 910, the UE determines that the measurement satisfies (e.g., is greater than or equal to) the at least one threshold (e.g., the ED threshold), then:

At 914, the UE may quantize the measurement based on comparison of the measurement to the plurality of thresholds. For example, the UE may compare the measurement with at least two thresholds, and the UE may determine which of the two thresholds the measurement is between, or the UE may determine the measurement is below all thresholds, or the UE may determine that the measurement is above all thresholds. Based on the comparison, the UE may then quantize the measurement by determining a value or range of values corresponding to the two thresholds the measurement falls between, or corresponding to the lowest threshold when the measurement falls below all thresholds, or corresponding to the highest threshold when the measurement is above all thresholds.

Referring to 914 in the context of FIGS. 4-7, the UE 404 may quantize the measured energy 510 based on comparison of the measured energy with one or more of the ED threshold 512, threshold 0 514, threshold 1 516, and/or threshold 2 518. Based on the comparison the UE 404 may quantize the measured energy 510 by assigning a value or range of values to the measured energy according to relationship of the measured energy 510 to one or more of the ED threshold 512, threshold 0 514, threshold 1 516, and/or threshold 2 518.

At 916, the UE may determine an interference level associated with the wireless channel. In some aspects, the UE may determine the interference level based on receiving the PG message. For example, the PG message may trigger a contention-based procedure (e.g., CCA or eCCA) during which time the UE may determine the interference level, e.g., based on measuring energy on the wireless channel. The UE may measure energy during an IMR and/or CCA or eCCA, and/or the UE may measure energy based on receiving at least one of the set of CSI-RSs (e.g., at least one of the set of CSI-RSs may be configured by the base station for channel measurement). The UE may determine (e.g., select, calculate, compute) an interference level associated with the wireless channel proximate to the UE based on the measured energy.

In some aspects, the UE may determine the interference level based on quantizing the measurement of the energy on the wireless channel. For example, the UE may compare the measurement with one or more of the plurality of thresholds, and the UE may then determine the interference level associated with the wireless channel proximate to the UE based on the range between two thresholds that the measurement is between. For example, depending upon the comparison of the measurement to the thresholds, the UE may quantize the measurement in order to determine an interference level that is one of relatively high, medium, or relatively low based on the two thresholds of the plurality of thresholds that the measurement falls between. In another example, the UE may quantize the measurement in order to determine an interference level that indicates the channel is clear and/or indicates that no (or very low) interference is detectable when the UE determines the measurement falls below the threshold configured with the lowest value. In other words, the UE may quantize the measurement in order to determine an interference level that indicates a ceiling that is equal to the threshold configured with the lowest value when the UE determines the measurement falls below all of the plurality of thresholds.

Referring to 916 in the context of FIGS. 4-7, the UE 404 may determine the interference level 430, e.g., based on measuring energy on the wireless channel during eCCA 426. For example, the UE 404 may determine the interference level 430 by quantizing the measured energy 510 based on comparison of the measured energy with one or more of the ED threshold 512, threshold 0 514, threshold 1 516, and/or threshold 2 518. Based on the comparison the UE 404 may quantize the measured energy 510 by assigning a value or range of values to the measured energy according to relationship of the measured energy 510 to one or more of the ED threshold 512, threshold 0 514, threshold 1 516, and/or threshold 2 518, and the UE 404 may determine the value or range of values is included in the interference level 430.

At 918, the UE may determine an interfering spatial signature based on the interference on the wireless channel. For example, the UE may detect energy on the wireless channel, e.g., on an IMR, during CCA or eCCA, and/or based on at least one of the set of CSI-RSs (e.g., at least one CSI-RS configured by the base station for channel measurement). Based on detecting the energy on the wireless channel, the UE may determine an interference pattern and/or interference structure on the wireless channel resulting from an interferer, such as a dominant interferer or other source of interference on the wireless channel. The UE may determine the interfering spatial signature according to the determined interference pattern and/or interference structure.

Referring to 918 in the context of FIGS. 4 and 7, the UE 404 may determine an interfering spatial signature based on the interference on the wireless channel on which the mmW link 410 is configured. For example, the UE 404 may detect energy on the wireless channel, e.g., on an IMR, during eCCA 426, and/or based on at least one of the set of CSI-RSs 712a-c (e.g., at least one CSI-RS configured by the base station for channel measurement). The UE 404 may detect energy on the wireless channel in response to receiving the PG message 424. Based on detecting the energy on the wireless channel, the UE 404 may determine an interfering spatial signature that corresponds to an interference pattern and/or interference structure on the wireless channel resulting from an interferer, such as a dominant interferer or other source of interference on the wireless channel.

At 920, the UE may determine an applicable CSI report from a plurality of CSI reports based on the comparison of the interfering spatial signature to the respective spatial signatures associated with the plurality of CSI reports. The UE may have generated each of the plurality of CSI reports prior to receiving the PG message, and the UE may have stored each of the plurality of CSI reports in associated with a respective spatial signature. The UE may compare the interfering spatial signature (e.g., determined at a current time) with one or more of the stored respective spatial signatures. Based on the comparison, the UE may determine whether the interfering spatial signatures matches (e.g., within a margin of error) one of the stored respective spatial signatures. If the UE determines that the interfering spatial signature matches one of the stored respective spatial signatures, then the UE may identify the one of the plurality of CSI reports that is stored in association with the matching spatial signature. The UE may then determine that the identified CSI report is applicable to the interference pattern and/or structure observed by the UE in response to the PG message based on the associated spatial signature matching the interfering spatial signature.

Referring to 920 in the context of FIGS. 4 and 7, the UE 404 may determine an applicable one of the CSI reports 0-n 714a-c based on comparison of an interfering spatial signature (e.g., determined during eCCA 426) to one or more of the stored first through $n^{th}$ spatial signatures. For example, the UE 404 may determine that the second spatial signature matches (e.g., within a margin of error) the interfering spatial signature, and the UE 404 may determine that the CSI report 1 714b associated with the second spatial signature is the applicable CSI report based on the second spatial signature matching (e.g., within a margin of error) the interfering spatial signature.

At 922, the UE may transmit an ACK message responsive to the PG message to the base station. The UE may transmit the ACK message to the base station on the wireless channel, and the ACK message may include information indicating the interference level associated with the wireless channel proximate to the UE. For example, the UE may transmit the ACK message on a set of resource indicated by the PG message. Potentially, the ACK message may be triggered by the PG message and/or the PG message may trigger a CCA or eCCA procedure upon which the interference level indicated by the ACK message is based.

In some aspects, the transmission of the ACK message may serve as the indication of the interference level (e.g., as the absence of the ACK message may indicate the interference level is high and/or the wireless channel is busy or occupied). In some other aspects, the UE may include a value in the ACK message to indicate the interference level—e.g., the value may be based on quantizing the measured energy on the wireless channel. In still other aspects, the ACK message may include at least one CSI report (e.g., a CSI report generated in response to receiving the PG message or an earlier-generated CSI report determined to be applicable based on association with a spatial signature matching the interfering spatial signature). For example, the at least one CSI report may be an aperiodic or semi-persistent CSI report, and the reporting of the at least one CSI report may be triggered by the PG message.

Referring to 922 in the context of FIG. 4, the UE 404 may transmit, to the base station 402 in response to the PG message 424, the ACK message 428 indicating the interference level 430 in response to the PG message 424. In the context of FIGS. 4 and 6, the UE 404 may transmit, to the base station 402 in response to the PG message 424, the ACK message 428 including the at least one CSI report 614 indicating the interference level 430. In the context of FIGS. 4 and 7, the UE 404 may transmit, to the base station 402 in response to the PG message 424, the ACK message 428 including the at least one of the CSI reports 0-n 714a-c indicating the interference level 430.

Figure 10:
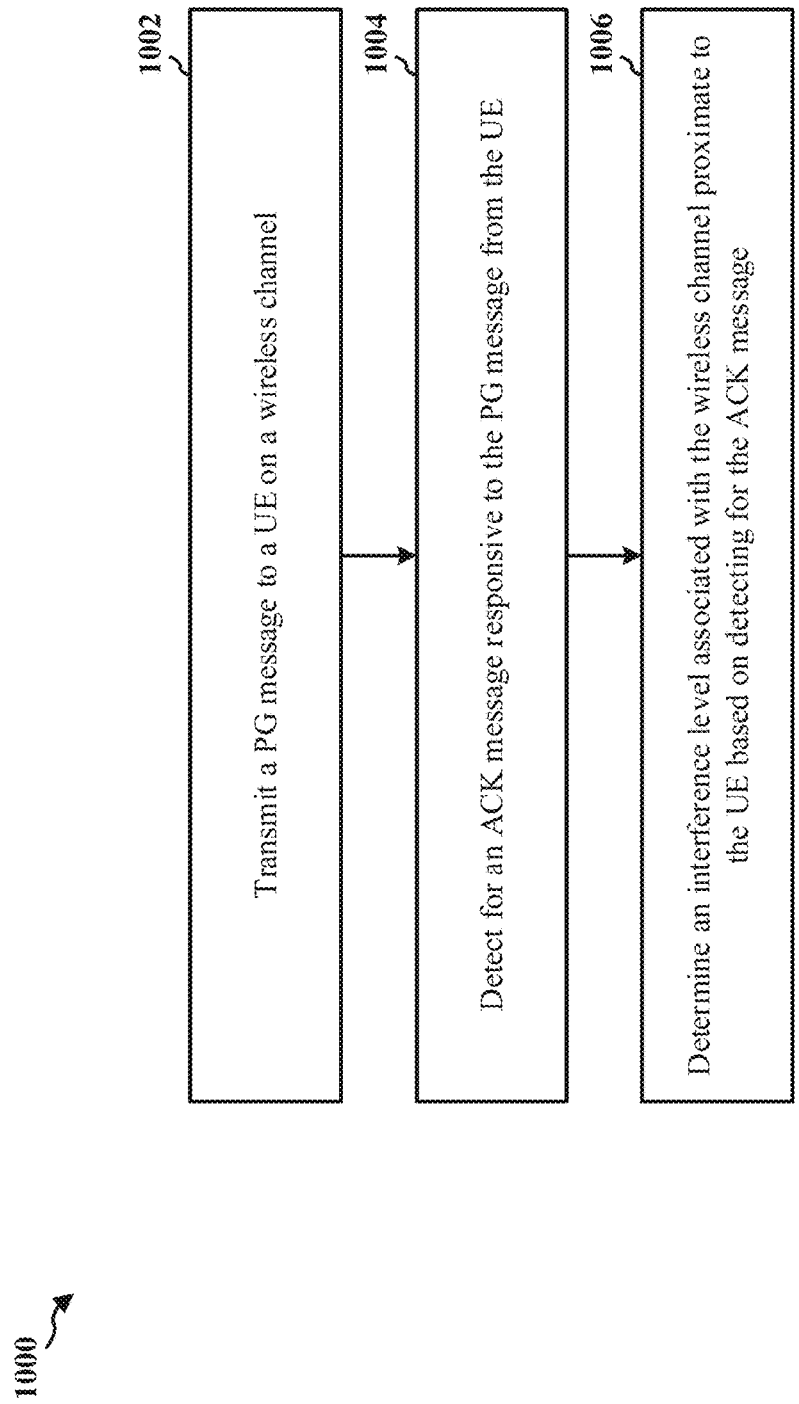
FIG. 10 is a flowchart of an example method of wireless communication by a base station, in accordance with various aspects of the present disclosure.

FIG. 10 is a flowchart of a method 1000 of wireless communication. The method 1000 may be performed by a base station (e.g., the base station 102/180, 310, 402, which may include the memory 376 and which may be the entire base station 102/180, 310, 402, or a component of the base station 102/180, 310, 402, such as the TX processor 316, the RX processor 370, and/or the controller/processor 375) and/or apparatus (e.g., the apparatus 1302). According to different aspects of the method 1000, one or more of the illustrated operations may be omitted, transposed, and/or contemporaneously performed.

At 1002, the base station may transmit a PG message to a UE on a wireless channel. For example, the wireless channel may be in an unlicensed band.

Referring to 1002 in the context of FIG. 4, the base station 402 may transmit the PG message 424 to the UE 404 on the wireless channel on which the mmW link 410 is configured.

At 1004, the base station may detect for an ACK message responsive to the PG message from the UE. For example, the base station may allocate a set of resources on which the ACK message is to be carried when transmitted by the UE. The base station may include information indicating the set of resources in the PG message. Accordingly, the base station may monitor the allocated set of resources for the ACK message from the UE after transmission of the PG message. In some aspects, the base station may monitor the allocated set of resources for a certain duration, such as the duration of a timeout or countdown timer within which the base station expects the ACK message responsive to the PG message from the UE.

Referring to 1004 in the context of FIG. 4, the base station 402 may detect for the ACK message 428 responsive to the PG message 424 from the UE 404.

At 1006, the base station may determine an interference level associated with the wireless channel proximate to the UE based on detecting for the ACK message. In some aspects, the UE may indicate the interference level to the base station by determining that the measured energy on the wireless channel satisfies an ED threshold, and then refraining from transmitting an ACK message responsive to the PG message when the measured energy on the wireless channel satisfies the ED threshold. The base station may determine the interference level based on detecting an absence of the ACK message responsive to the PG message—e.g., the base station may determine that the interference level on the wireless channel proximate to the UE is high and/or may determine that the wireless channel is busy or occupied based on the absence of the ACK message responsive to the PG message. In some other aspects, the base station may receive the ACK message responsive to the PG message from the UE, and the ACK message may include information indicating the interference level associated with the wireless channel proximate to the UE. The base station may determine the interference level associated with the wireless channel proximate to the UE based on the information included in the ACK message responsive to the PG message.

Referring to 1006 in the context of FIG. 4, the base station 402 may determine the interference level 430 based on detecting for the ACK message 428 in response to the PG message 424. For example, the base station 402 may determine that the interference level 430 associated with the wireless channel proximate to the UE 404 is high and the wireless channel is busy or occupied based on determining that the ACK message 428 responsive to the PG message 424 is absent. In another example, the base station 402 may determine the interference level 430 associated with the wireless channel proximate to the UE 404 based on receiving the ACK message 428 responsive to the PG message 424, which may include information indicating the interference level 430.

Figure 11:
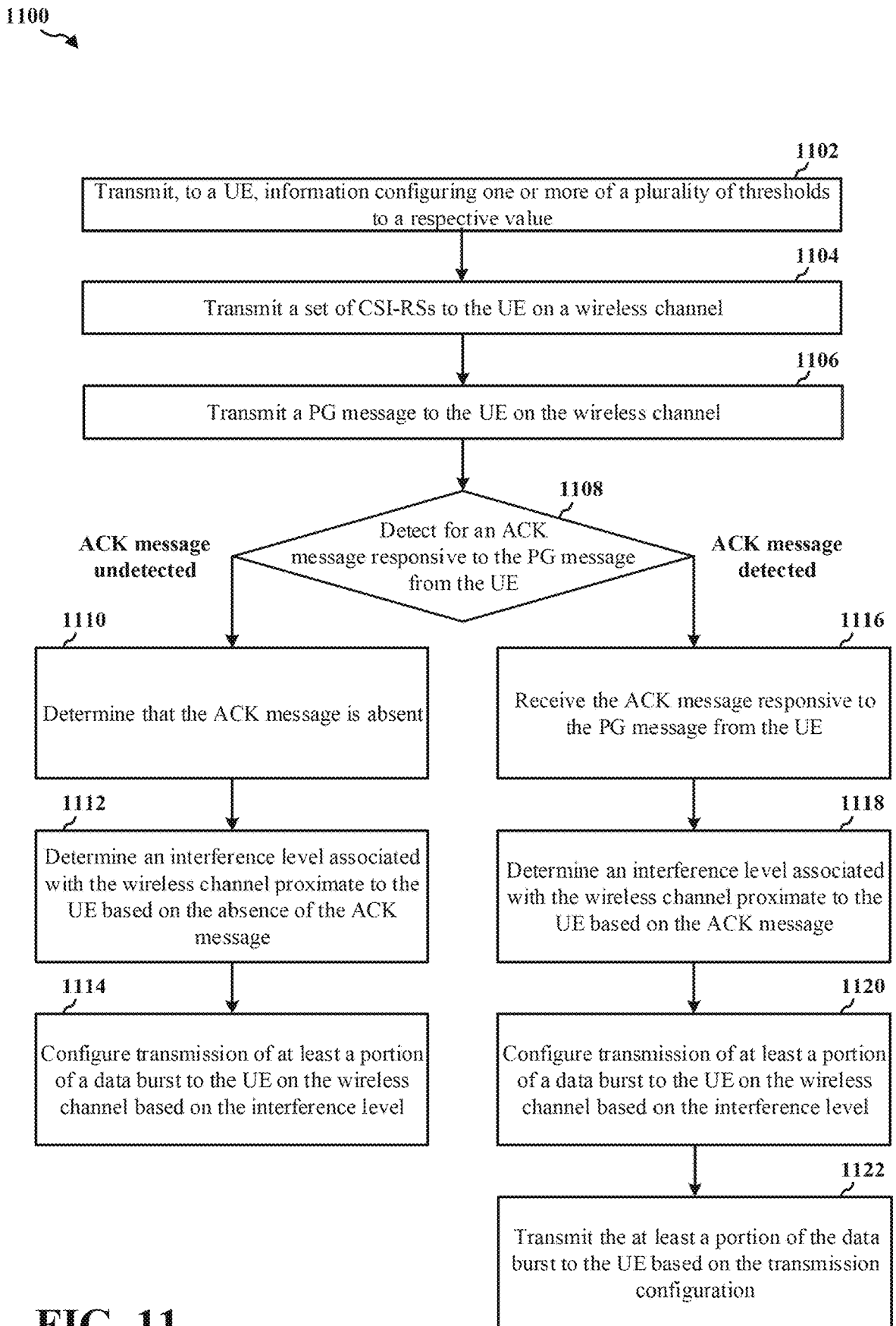
FIG. 11 is a flowchart of another example method of wireless communication by a base station, in accordance with various aspects of the present disclosure.

FIG. 11 is a flowchart of a method 1100 of wireless communication. The method 1100 may be performed by a base station (e.g., the base station 102/180, 310, 402, which may include the memory 376 and which may be the entire base station 102/180, 310, 402, or a component of the base station 102/180, 310, 402, such as the TX processor 316, the RX processor 370, and/or the controller/processor 375) and/or apparatus (e.g., the apparatus 1302). According to different aspects of the method 1100, one or more of the illustrated operations may be omitted, transposed, and/or contemporaneously performed.

At 1102, the base station may transmit, to a UE, information configuring one or more of a plurality of thresholds to a respective value. For example, each of the plurality of thresholds may be a value (e.g., in dBm) associated with measuring energy on a wireless channel in an environment proximate to the UE. The information may configure one or more of a plurality of thresholds that is different from an ED threshold—e.g., an ED threshold may be set (e.g., preconfigured) according to one or more protocols and/or standards, such as one or more protocols and/or standards promulgated by IEEE and/or 3 GPP.

Referring to 1102 in the context of FIGS. 4-7, the base station 402 may transmit, to the UE 404, information configuring one or more of threshold 0 514, threshold 1 516, and/or threshold 2 518 to a respective value, such as a dBm value.

At 1104, the base station may transmit a set of CSI-RSs to the UE on a wireless channel. In some aspects, the base station may transmit the set of CSI-RSs in one time period. For example, the set of CSI-RSs may be transmitted on a set of resources that are included in one slot or one subframe. In another example, the set of CSI-RSs may be transmitted on a set of resources associated with the same downlink burst. In some other aspects, the base station may transmit the set of CSI-RSs over multiple different time periods. For example, the set of CSI-RSs may include a plurality of subsets of CSI-RSs, and the base station may transmit each of the plurality of subsets of CSI-RSs on a respective set of resources (e.g., a slot and/or subframe) at a respective time of a plurality of different times (e.g., time 0, time 1, . . . , time n).

In some aspects, the base station may configure at least one resource of the set of resources on which the set of CSI-RSs is transmitted as an IMR. In some other aspects, the base station may configure at least one subset of the set of CSI-RSs for channel measurement—e.g., at least one resource of the at least one subset of the set of CSI-RSs configured for channel measurement may be used by the UE as an IMR, such as at least one resource on which the UE measures energy on the wireless channel.

Referring to 1104 in the context of FIGS. 4 and 6, the base station 402 may transmit the set of CSI-RSs 612 to the UE 404 on the wireless channel on which the mmW link 410 is configured. In the context of FIGS. 4 and 7, the base station 402 may transmit each of the sets of CSI-RSs 712*a-c* to the UE 404 on the wireless channel on which the mmW link 410 is configured.

At 1106, the base station may transmit a PG message to the UE on the wireless channel. For example, the PG message may be a relatively short and/or small (in size) message, e.g., carried on two symbols, which may trigger a contention-based procedure (e.g., an eCCA procedure) by the UE. In some aspects, the PG message may include a duration for which energy on the wireless channel is to be measured for the contention-based procedure (e.g., eCCA). In some other aspects, the PG message may include information indicating a set of resources on which an ACK message responsive to the PG message is to be carried.

In some aspects, the base station may transmit the PG message on a set of resources at least partially overlapping with the set of resources carrying at least one of the set of CSI-RSs. In some other aspects, the base station may transmit the PG message after transmitting the set of CSI-RSs. In some further aspects, the PG message may trigger CSI reporting by the UE—e.g., the PG message may trigger the UE for aperiodic CSI reporting or semi-persistent CSI reporting.

Referring to 1106 in the context of FIGS. 4, 6, and 7, the base station 402 may transmit the PG message 424 to the UE 404 on the wireless channel on which the mmW link 410 is configured.

At 1108, the base station may detect for an ACK message responsive to the PG message from the UE. For example, the base station may allocate a set of resources on which the ACK message is to be carried when transmitted by the UE. The base station may include information indicating the set of resources in the PG message. Accordingly, the base station may monitor the allocated set of resources for the ACK message from the UE after transmission of the PG message.

Referring to 1108 in the context of FIG. 4, the base station 402 may detect for the ACK message 428 responsive to the PG message 424 from the UE 404.

If, at 1108, the ACK message is undetected based on detecting for the ACK message responsive to the PG message on the wireless channel:

At 1110, the base station may determine that the ACK message responsive to the PG message is absent from the wireless channel. In some aspects, the base station may monitor the allocated set of resources for a certain duration, such as the duration of a timeout or countdown timer within which the base station expects the ACK message responsive to the PG message from the UE. For example, the base station may initiate a countdown timer based on transmitting the PG message, and the base station may determine whether the ACK message is received upon expiration of the countdown timer. If the base station determines that the ACK message responsive to the PG message is undetected (e.g., has not been received) upon expiration of the countdown timer, then the base station may determine that the ACK message responsive to the PG message is absent from the wireless channel.

Referring to 1110 in the context of FIG. 4, the base station 402 may determine that the ACK message 428 responsive to the PG message 424 is absent and/or has not been received from the UE 404.

At 1112, the base station may determine an interference level associated with the wireless channel proximate to the UE based on the absence of the ACK message. In some aspects, the interference level may be based on at least one of a CCA procedure or an eCCA procedure by the UE. For example, the PG message may configure the duration of the eCCA procedure for the UE. The base station may determine that the absence of the ACK message responsive to the PG message indicates that an energy measurement by the UE satisfies (e.g., is greater than or equal to) an ED threshold, e.g., according to the CCA or eCCA procedure performed by the UE. Based on the determination that the energy measurement by the UE satisfies the ED threshold, the base station may determine that the interference level on the wireless channel proximate to the UE is very high, that the interference level is at least equal to the ED threshold, and/or that the interference level corresponds to the wireless channel being busy or occupied.

Referring to 1112 in the context of FIG. 4, the base station 402 may determine the interference level 430 based on the absence of the ACK message 428 responsive to the PG message 424 from the UE 404. For example, referring to FIG. 5, the base station 402 may determine that measured energy 510 by the UE 404 satisfies the ED threshold 512, and therefore, the interference level 430 is at least equal to the ED threshold 512.

At 1114, the base station may configure transmission of at least a portion of a data burst to the UE on the wireless channel based on the interference level. In some aspects, the base station may determine that the wireless channel proximate to the UE is busy or occupied, e.g., to a point at which other transmissions should back off to defer to ongoing transmissions. For example, when the base station determines that the interference level associated with wireless channel proximate to the UE indicates that the energy on the wireless channel proximate to the UE satisfies the ED threshold, the base station may determine to back off from transmission of the data burst.

Accordingly, the base station may refrain from transmitting at least a portion of a data burst to the UE on the wireless channel based on the interference level. In some aspects, the base station may initiate a back off timer based upon determining that the wireless channel proximate to the UE is busy or occupied. The base station may detect expiration of the back off timer, and may retry transmission of the data burst upon detecting the expiration of the back off timer.

Referring to 1114 in the context of FIGS. 4, 6, and 7, the base station 402 may configure transmission of at least a portion of the data burst 434 to the UE 404 on the wireless channel on which the mmW link 410 is configured based on the interference level 430. For example, referring to FIG. 5, when the base station 402 determines that the interference level 430 corresponds to a measured energy 510 that satisfies the ED threshold 512, the base station 402 may back off from transmission of at least a portion of the data burst 434 to the UE 404 on the wireless channel on which the mmW link 410 is configured.

If, at 1108, the ACK message is detected based on detecting for the ACK message responsive to the PG message on the wireless channel:— that is, if the base station determines:

At 1116, the base station may receive the ACK message responsive to the PG message from the UE. The base station may receive the ACK message on a set of resources indicated to the UE by the PG message. In some aspects, the ACK message may include a quantized value indicating the interference level associated with the wireless channel proximate to the UE. For example, the quantized value may be based on the one or more of the plurality of thresholds configured to a respective value at the UE by the base station.

In some other aspects, the ACK message may include at least one CSI report, which may be based on at least a subset of the set of CSI-RSs transmitted to the UE. For example, the at least one CSI report may include at least one of a short CSI report and/or a fast CSI report, e.g., including some reduced or limited information. The ACK message may further include information indicating an interfering spatial signature upon which the at least one CSI report is based— e.g., the interfering spatial signature may correspond to an interference pattern or interference structure observed by the UE on the wireless channel proximate to the UE when the UE is generating the at least one CSI report.

Referring to 1116 in the context of FIG. 4, the base station 402 may receive the ACK message 428 responsive to the PG message 424 from the UE 404 on the wireless channel on which the mmW link 410 is configured, and the ACK message 428 may include information indicating the interference level. For example, in the context of FIG. 6, the base station 402 may receive, from the UE 404, the ACK message 428 including at least one CSI report 614 that indicates the interference level 430. In another example, in the context of FIG. 7, the base station 402 may receive, from the UE 404, the ACK message 428 including at least one of the CSI reports 0-n 714a-c that indicates the interference level 430, and the at least one of the CSI reports 0-n 714a-c may be associated with an interfering spatial signature.

At 1118, the base station may determine an interference level associated with the wireless channel proximate to the UE based on the ACK message. For example, the base station may identify information included in the ACK message that is carried in a payload and/or carried on a PUCCH, and the base station may determine the interference level based on the identified information, which may be at least one of a quantized value or a CSI report. In particular, the base station may determine an interference level that corresponds to the quantized value or corresponds to a least a portion of the information included in the CSI report.

In another example, the base station may determine that receiving the ACK message responsive to the PG message (implicitly) indicates the interference level associated with the wireless channel proximate to the UE, and the base station may determine the interference level based on receiving the ACK message. In particular, the base station may determine that the interference level indicates that the wireless channel proximate to the UE is open or unoccupied based on receiving the ACK message, as the energy measured on the wireless channel by the UE is to be less than the ED threshold for the UE to transmit the ACK message responsive to the PG message.

Referring to 1118 in the context of FIG. 4, the base station 402 may determine the interference level 430 based on detecting for the ACK message 428 in response to the PG message 424. For example, the base station 402 may determine that the interference level 430 associated with the wireless channel proximate to the UE 404 is high and the wireless channel is open or unoccupied based on receiving the ACK message 428 responsive to the PG message 424. In another example, the base station 402 may determine the interference level 430 associated with the wireless channel proximate to the UE 404 based on information included in the ACK message 428 responsive to the PG message 424, which may include information at least one of a quantized value indicating the interference level 430.

Referring to FIG. 6, for example, the base station 402 may determine the interference level 430 associated with the wireless channel proximate to the UE 404 based on at least one CSI report 614 included in the ACK message 428 responsive to the PG message 424, and the at least one CSI report may indicate the interference level 430. Referring to FIG. 7, as another example, the base station 402 may determine the interference level 430 associated with the wireless channel proximate to the UE 404 based on at least one of the CSI reports 0-n 714a-c included in the ACK message 428 responsive to the PG message 424, and the at least one of the CSI reports 0-n 714a-c may indicate the interference level 430.

At 1120, the base station may configure transmission of at least a portion of a data burst based on the interference level. The base station may configure transmission of the at least a portion of the data burst based on the interference level by configuring at least one transmission parameter to increase the probability of reception and successful decoding of the data burst by the UE in the interference environment proximate to the UE, while also potentially considering overhead and/or causing interference to other devices communicating on the wireless channel.

For example, the base station may increase the transmission power by less than a maximum amount when the base station determines that the interference level associated with the wireless channel proximate to the UE includes some medium amount of interference (e.g., energy is detected on the wireless channel but the detected energy is less than the ED threshold and/or energy detected on the wireless channel falls between two interference thresholds). According to various aspects, the base station may determine at least one transmission parameter based on the interference level, such as at least one of a modulation scheme, coding rate, MCS, TB size, number of layers or streams, transmission power, precoder, and/or other transmission parameter(s). The base station may then apply the determined at least one transmission parameter for transmission of at least a portion of a data burst to be transmitted to the UE on the wireless channel.

Referring to 1120 in the context of FIG. 4, the base station 402 may configure transmission of at least a portion of the data burst 434 based on the interference level 430.

At 1122, the base station may transmit the at least a portion of the data burst to the UE based on the transmission configuration. That is, the base station may transmit at least a portion of the data burst using the applied at least one transmission parameter determined based on the interference level. For example, the base station may transmit at least a portion of the data burst using at least one of a modulation scheme, coding rate, MCS, TB size, number of layers or streams, transmission power, precoder, and/or other transmission parameter(s) configured based on the interference level.

Referring to 1122 in the context of FIG. 4, the base station 402 may transmit the at least a portion of the data burst 434 to the UE 404 on the wireless channel on which the mmW link 410 is configured using the at least one transmission parameter configured based on the interference level 430.

Figure 12:
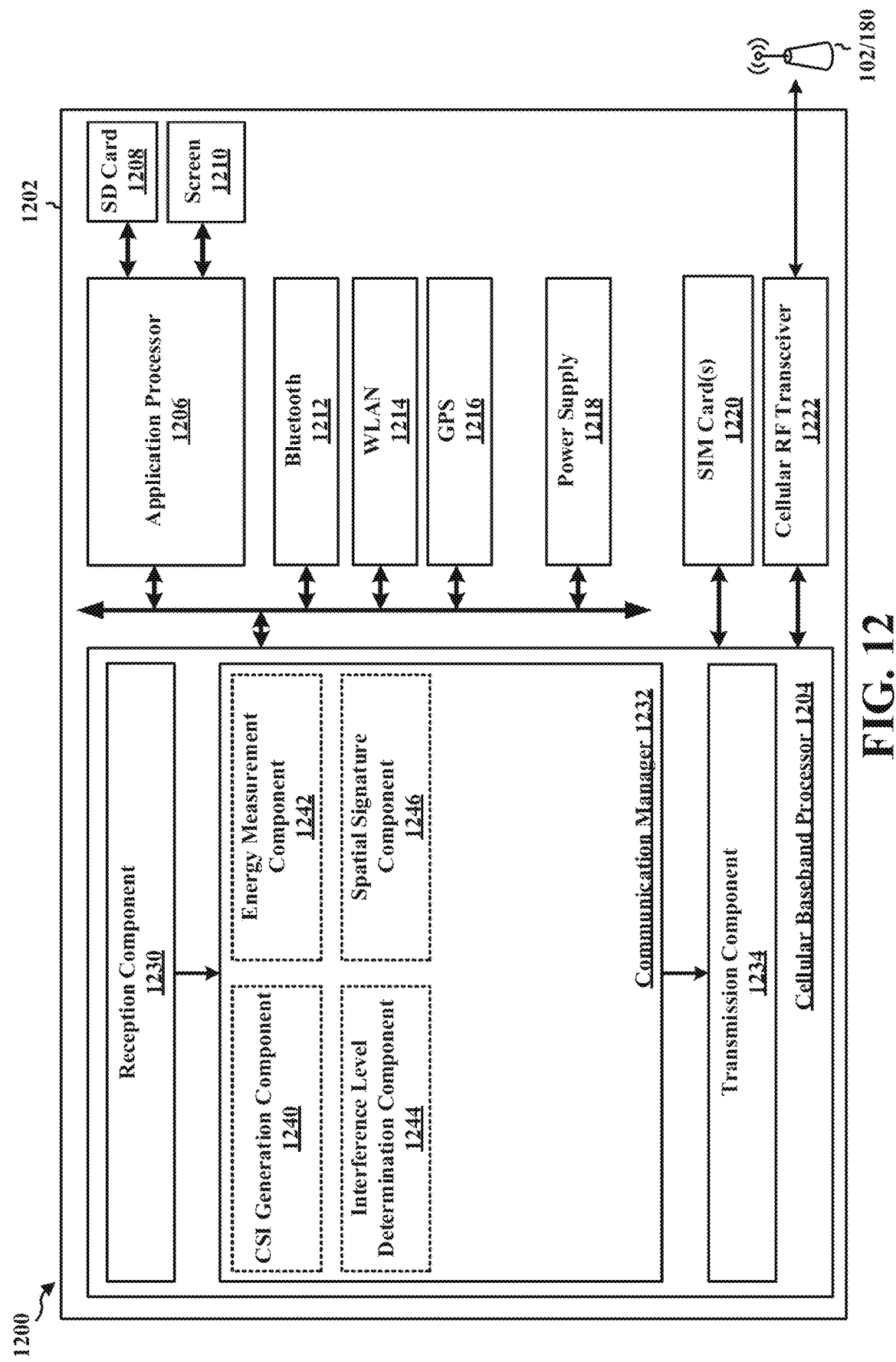
FIG. 12 is a diagram illustrating an example of a hardware implementation for an example apparatus, in accordance with various aspects of the present disclosure.

FIG. 12 is a diagram 1200 illustrating an example of a hardware implementation for an apparatus 1202. The apparatus 1202 is a UE and includes a cellular baseband processor 1204 (also referred to as a modem) coupled to a cellular RF transceiver 1222 and one or more subscriber identity modules (SIM) cards 1220, an application processor 1206 coupled to a secure digital (SD) card 1208 and a screen 1210, a Bluetooth module 1212, a WLAN module 1214, a Global Positioning System (GPS) module 1216, and a power supply 1218. The cellular baseband processor 1204 communicates through the cellular RF transceiver 1222 with the UE 104 and/or base station 102/180. The cellular baseband processor 1204 may include a computer-readable medium/memory. The computer-readable medium/memory may be non-transitory. The cellular baseband processor 1204 is responsible for general processing, including the execution of software stored on the computer-readable medium/memory. The software, when executed by the cellular baseband processor 1204, causes the cellular baseband processor 1204 to perform the various functions described supra. The computer-readable medium/memory may also be used for storing data that is manipulated by the cellular baseband processor 1204 when executing software. The cellular baseband processor 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the cellular baseband processor 1204. The cellular baseband processor 1204 may be a component of the UE 350 and may include the memory 360 and/or at least one of the TX processor 368, the RX processor 356, and the controller/processor 359. In one configuration, the apparatus 1202 may be a modem chip and include just the baseband processor 1204, and in another configuration, the apparatus 1202 may be the entire UE (e.g., see 350 of FIG. 3) and include the aforediscussed additional modules of the apparatus 1202.

According to various aspects, the reception component 1230 may be configured to receive, from the base station 102/180, information configuring one or more of a plurality of interference level thresholds to a respective value, e.g., as described in connection with 902 of FIG. 9. The reception component 1230 may be further configured to receive a set of CSI-RSs from the base station 120/180 on a wireless channel, e.g., as described in connection with 904 of FIG. 9.

The communication manager 1232 may include a CSI generation component 1240 that receives input(s) based on the set of CSI-RSs from the reception component 1230. The CSI generation component 1240 may be configured to generate at least one CSI report based on receiving at least a subset of the set of CSI-RSs, e.g., as described in connection with 906 of FIG. 9. In some aspects, the at least one CSI report may include at least one of a short CSI report and/or a fast CSI report, e.g., based on at least one of short CSI computation and/or fast CSI computation. In some other aspects, the at least one CSI report may include a plurality of CSI reports, and each of the plurality of CSI reports may be associated with a respective spatial signature.

The reception component 1230 may be further configured to receive a PG message from the base station 102/180 on the wireless channel, e.g., as described in connection with 802 of FIG. 8 and/or in connection with 908 of FIG. 9. In some aspects, the PG message may be received on a set of resources at least partially overlapping with a set of resources on which the set of CSI-RSs is received. In some other aspects, the PG message may be received after the set of CSI-RSs is received, and potentially, after the at least one CSI report is generated.

In some aspects, the PG message may include information triggering aperiodic or semi-persistent CSI reporting by the apparatus 1202. In some other aspects, the PG message may include information triggering a CCA or eCCA procedure by the apparatus 1202. For example, the PG message may include information indicating a duration over which to measure energy on the wireless channel for the eCCA procedure. In some further aspects, the PG message may include information indicating a set of resources on which an ACK message responsive to the PG message is to be carried.

The communication manager 1232 may further include an energy measurement component 1242 that may be configured to determine a measurement indicative of interference proximate to the apparatus 1202, e.g., as described in connection with 910 of FIG. 9. For example, the energy measurement component 1242 may be configured to measure the total energy on the wireless channel during a CCA or eCCA procedure, e.g., for a duration configured by the PG message.

In some aspects, the energy measurement component 1242 may be configured to determine whether the measurement indicative of interference proximate to the apparatus 1202 satisfies (e.g., is greater than or equal to) an ED threshold. If the energy measurement component 1242 determines that the measurement satisfies the ED threshold, then the energy measurement component 1242 may configure the transmission component 1234 to refrain from transmitting an ACK message responsive to the PG message to the base station 102/180, e.g., as described in connection with 912 of FIG. 9. In other words, the energy measurement component 1242 may indicate the interference level to the base station 102/180 in response to the PG message based on the absence of the ACK message responsive to the PG message, e.g., as described in connection with 806 of FIG. 8.

In some aspects, the absence of the ACK message responsive to the PG message may indicate an interference level associated with the wireless channel proximate to the apparatus 1202 to the base station 102/180—e.g., the absence of the ACK message may indicate that the interference level is very high, and the wireless channel is busy and/or occupied to a point at which other transmissions should back off and defer to ongoing transmissions on the wireless channel.

The communication manager 1232 may further include an interference level determination component 1244 that may receive input(s) from the energy measurement component 1242 based on the measurement indicative of interference proximate to the apparatus 1202. The interference level determination component 1244 may be configured to quantize the measurement based on comparison of the measurement to the plurality of interference level thresholds (e.g., as configured by the base station 102/180), e.g., as described in connection with 914 of FIG. 9.

The interference level determination component 1244 may be further configured to determine an interference level associated with the wireless channel, e.g., as described in connection with 804 of FIG. 8 and/or in connection with 916 of FIG. 9. For example, the interference level determination component 1244 may determine the interference level based on the measurement indicative of interference proximate to the apparatus 1202. In some aspects, the interference level determination component 1244 may determine the interference level based on quantizing the measurement.

The communication manager 1232 may further include a spatial signature component 1246 that may receive input(s) from the energy measurement component 1242 based on the measurement indicative of interference proximate to the apparatus 1202. The spatial signature component 1246 may be configured to determine an interfering spatial signature based on the interference on the wireless channel (e.g., as provided by the energy measurement component 1242), e.g., as described in connection with 918 of FIG. 9.

The spatial signature component 1246 may be further configured to determine an applicable CSI report from the plurality of CSI reports based on comparison of the interfering spatial signature to one or more of the respective spatial signatures, e.g., as described in connection with 920 of FIG. 9. The spatial signature component 1246 may determine one of the respective spatial signatures that matches the interfering spatial signature based on the comparison, and the spatial signature component 1246 may then identify the applicable CSI report as the one of the plurality of CSI reports associated with the respective spatial signature determined to match the interfering spatial signature.

The transmission component 1234 may receive input(s) of the interference level from the interference level determination component 1244 and/or of at least one CSI report from the CSI generation component 1240 and/or spatial signature component 1246. The transmission component 1234 may then be configured to transmit, to the base station 102/180, an ACK message responsive to the PG message indicating the interference level, e.g., as described in connection with 922 of FIG. 9. In other words, the transmission component 1234 may indicate the interference level to the base station 102/180 in response to the PG message based on transmitting the ACK message responsive to the PG message to the base station 102/180, e.g., as described in connection with 806 of FIG. 8. The transmission component 1234 may transmit the ACK message on a set of resources indicated by the PG message.

In some aspects, the ACK message may include at least one CSI report, which may be an aperiodic or semi-persistent CSI report triggered by the PG message. Potentially, the at least one CSI report may indicate the interference level. For example, the at least one CSI report may include the applicable CSI report determined by the spatial signature component 1246 from matching the respective associated spatial signature to the interfering spatial signature. In some other aspects, the ACK message may include the quantized value indicating the interference level. In some further aspects, the ACK message may be the indication of the interference level.

The apparatus 1202 may include additional components that perform some or all of the blocks, operations, signaling, etc. of the algorithm(s) in the aforementioned call flow diagrams and/or flowcharts of FIGS. 4 and 6-9. As such, some or all of the blocks, operations, signaling, etc. in the aforementioned call flow diagrams and/or flowcharts of FIGS. 4 and 6-9 may be performed by a component and the apparatus 1202 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1202, and in particular the cellular baseband processor 1204, includes means for receiving a PG message from a base station on a wireless channel; means for determining an interference level associated with the wireless channel; and means for indicating the interference level to the base station in response to the PG message.

In one configuration, the interference level is determined based on a measurement indicative of interference proximate to the apparatus 1202 on the wireless channel, the measurement being determined in a duration associated with at least one of a CCA or an eCCA.

In one configuration, the apparatus 1202, and in particular the cellular baseband processor 1204, may further include means for determining the measurement indicative of interference proximate to the apparatus 1202 on the wireless channel, and the interference level is based on the measurement indicative of the interference proximate to the apparatus 1202 on the wireless channel.

In one configuration, the apparatus 1202, and in particular the cellular baseband processor 1204, may further include means for refraining from transmitting an ACK message responsive to the PG message to the base station when the measurement satisfies an ED threshold, and the absence of the ACK message responsive to the PG message indicates the interference level to the base station.

In one configuration, the apparatus 1202, and in particular the cellular baseband processor 1204, may further include means for transmitting an ACK message responsive to the PG message to the base station, and the ACK message indicates the interference level.

In one configuration, the apparatus 1202, and in particular the cellular baseband processor 1204, may further include means for quantizing the measurement based on comparison of the measurement to a plurality of thresholds, and the interference level is determined based on quantizing the measurement.

In one configuration, the apparatus 1202, and in particular the cellular baseband processor 1204, may further include means for receiving, from the base station, information configuring one or more of the plurality of thresholds to a respective value.

In one configuration, the apparatus 1202, and in particular the cellular baseband processor 1204, may further include means for receiving a set of CSI-RSs from the base station on the wireless channel; and means for generating at least one CSI report based on receiving at least a subset of the set of CSI-RSs, and the ACK message includes the at least one CSI report.

In one configuration, the at least one CSI report includes at least one of a short CSI report or fast CSI report.

In one configuration, the set of CSI-RSs is received on a first set of resources at least partially overlapping with a second set of resources on which the PG message is received.

In one configuration, the PG message includes a trigger for aperiodic CSI reporting, and the at least one CSI report is included in the ACK message based on the trigger for aperiodic CSI reporting.

In one configuration, the apparatus 1202, and in particular the cellular baseband processor 1204, may further include means for determining an interfering spatial signature based on the interference on the wireless channel in response to receiving the PG message, and the at least one CSI report includes a plurality of CSI reports generated before the PG message is received that each is associated with a respective spatial signature; and means for determining an applicable CSI report from the plurality of CSI reports based on comparison of the interfering spatial signature to the respective spatial signatures, and the at least one CSI report included in the ACK message includes the applicable CSI report.

The aforementioned means may be one or more of the aforementioned components of the apparatus 1202 configured to perform the functions recited by the aforementioned means. As described supra, the apparatus 1202 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 13:
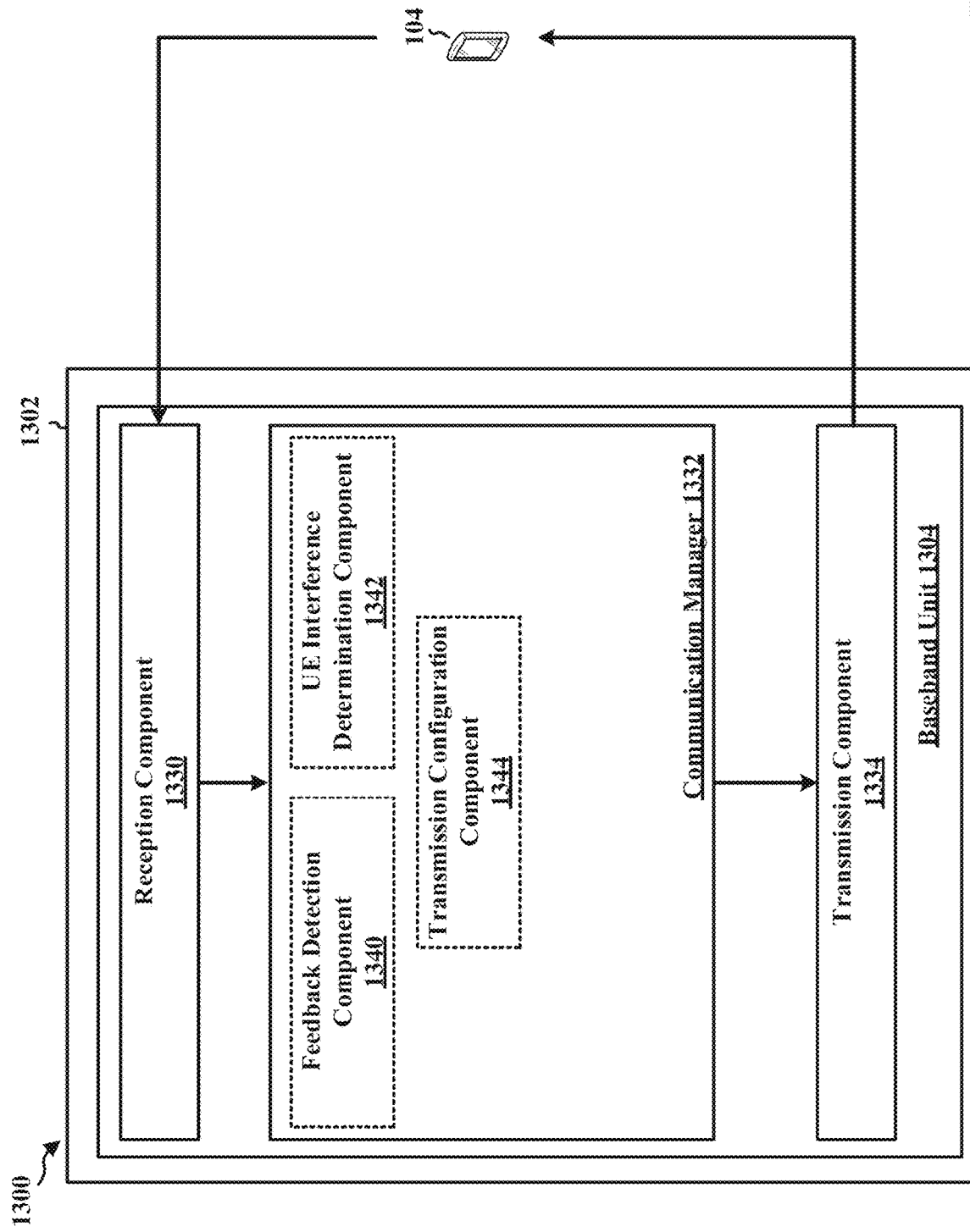
FIG. 13 is a diagram illustrating another example of a hardware implementation for another example apparatus, in accordance with various aspects of the present disclosure.

FIG. 13 is a diagram 1300 illustrating an example of a hardware implementation for an apparatus 1302. The apparatus 1302 is a base station and includes a baseband unit 1304. The baseband unit 1304 may communicate through a cellular RF transceiver with the UE 104. The baseband unit 1304 may include a computer-readable medium/memory. The baseband unit 1304 is responsible for general processing, including the execution of software stored on the computer-readable medium/memory. The software, when executed by the baseband unit 1304, causes the baseband unit 1304 to perform the various functions described supra. The computer-readable medium/memory may also be used for storing data that is manipulated by the baseband unit 1304 when executing software. The baseband unit 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the baseband unit 1304. The baseband unit 1304 may be a component of the base station 310 and may include the memory 376 and/or at least one of the TX processor 316, the RX processor 370, and the controller/processor 375.

According to various aspects, the transmission component 1334 may be configured to transmit, to the UE 104, information configuring one or more of a plurality of interference level thresholds to a respective value, e.g., as described in connection with 1102 of FIG. 11. The transmission component 1334 may be further configured to transmit, to the UE 104, a set of CSI-RSs on a wireless channel, e.g., as described in connection with 1104 of FIG. 11.

The transmission component 1334 may be further configured to transmit a PG message to the UE 104 on the wireless channel, e.g., as described in connection with 1002 of FIG. 10 and/or in connection with 1106 of FIG. 11. In some aspects, the PG message may be transmitted on a set of resources at least partially overlapping with a set of resources on which the set of CSI-RSs is transmitted. In some other aspects, the PG message may be transmitted after the set of CSI-RSs is transmitted.

In some aspects, the PG message may include information triggering aperiodic or semi-persistent CSI reporting by the UE 104. In some other aspects, the PG message may include information triggering a CCA or eCCA procedure by the UE 104. For example, the PG message may include information indicating a duration over which the UE 104 is to measure energy on the wireless channel for the eCCA procedure. In some further aspects, the PG message may include information indicating a set of resources on which an ACK message responsive to the PG message is to be carried.

The communication manager 1332 may include a feedback detection component 1340 that may be configured to detect for an ACK message responsive to the PG message from the UE on the wireless channel, e.g., as described in connection with 1004 of FIG. 10 and/or in connection with 1108 of FIG. 11. For example, the feedback detection component 1340 may monitor a set of resources indicated by the PG message to carry the ACK message from the UE 104.

In some aspects, the feedback detection component 1340 may be configured to determine that the ACK message responsive to the PG message is absent, e.g., as described in connection with 1110 of FIG. 11.

The communication manager 1332 may further include a UE interference determination component 1342 that may receive input(s) from the feedback detection component 1340 based on whether an ACK message responsive to the PG message is detected. The UE interference determination component 1342 may be configured to determine an interference level associated with the wireless channel proximate to the UE 104 based on detecting for the ACK message, e.g., as described in connection with 1006 of FIG. 10. For example, when the ACK message is undetected and determined to be absent from the wireless channel, the UE interference determination component 1342 may be configured to determine an interference level associated with the wireless channel proximate to the UE 104 based on the absence of the ACK message, e.g., as described in connection with 1112 of FIG. 11. For example, the UE interference determination component 1342 may be configured to determine that the interference level includes an energy measurement associated with the wireless channel proximate to the UE 104 that is greater than or equal to an ED threshold when the ACK message is determined to be absent from the wireless channel.

The communication manager 1332 may further include a transmission configuration component 1344 that receives input(s) from the UE interference determination component 1342. In some aspects, the transmission configuration component 1344 may configure transmission of at least a portion of a data burst to the UE 104 on the wireless channel based on the interference level being relatively high and/or indicating that the wireless channel proximate to the UE 104 is busy and/or occupied, e.g., as described in connection with 1114 of FIG. 11. For example, the transmission component 1334 may refrain from transmitting at least a portion of the data burst to the UE 104 in response to a determination that the interference level includes an energy measurement that is greater than or equal to an ED threshold when the ACK message is determined to be absent from the wireless channel.

However, when the ACK message is detected, then the feedback detection component 1340 may configure the reception component 1330 to receive the ACK message responsive to the PG message from the UE 104 on the wireless channel, e.g., as described in connection with 1116 of FIG. 11. The ACK message may be received on a set of resources indicated by the PG message.

The reception component 1330 may provide the ACK message as an input to the UE interference determination component 1342 when the feedback detection component 1340 detects the ACK message. The ACK message may indicate the interference level associated with the wireless channel proximate to the UE 104. The UE interference determination component 1342 may be configured to then determine an interference level associated with the wireless channel proximate to the UE 104 based on the ACK message, e.g., as described in connection with 1118 of FIG. 11.

In some aspects, the ACK message may include information indicating the interference level as a quantized value. In some other aspects, the ACK message may include at least one CSI report, and potentially, the at least one CSI report may indicate the interference level. In some further aspects, the at least one CSI report may include at least one of a short CSI report and/or a fast CSI report. Additionally or alternatively, the ACK message may include an indication of an interference spatial signature associated with the at least one CSI report.

Further, the at least one CSI report may be at least one of a periodic CSI report or a semi-persistent CSI report. The apparatus 1302 may trigger aperiodic or semi-persistent CSI reporting by the UE 104 using the PG message, such that the at least one CSI report may be received based on the PG message.

The UE interference determination component 1342 may provide, to the transmission configuration component 1344, information indicating the interference level determined based on receiving the ACK message responsive to the PG message. The transmission configuration component 1344 may configure transmission of at least a portion of a data burst to the UE 104 on the wireless channel based on the interference level determined from the ACK message responsive to the PG message, e.g., as described in connection with 1120 of FIG. 11.

The transmission configuration component 1344 may provide a transmission configuration that is based on the interference level to the transmission component 1334. The transmission component 1334 may be further configured to transmit at least a portion of the data burst to the UE 104 on the wireless channel based on the transmission configuration, e.g., as described in connection with 1122 of FIG. 11.

The apparatus 1302 may include additional components that perform some or all of the blocks, operations, signaling, etc. of the algorithm(s) in the aforementioned call flow diagrams and/or flowcharts of FIGS. 4, 6, 7, 10, and 11. As such, some or all of the blocks, operations, signaling, etc. in the aforementioned call flow diagrams and/or flowcharts of FIGS. 4, 6, 7, 10 and 11 may be performed by a component and the apparatus 1302 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1302, and in particular the baseband unit 1304, includes means for transmitting a PG message to a UE on a wireless channel; means for detecting for an ACK message responsive to the PG message from the UE; and means for determining an interference level associated with the wireless channel proximate to the UE based on detecting for the ACK message.

In one configuration, the means for determining the interference level associated with the wireless channel proximate to the UE based on detecting for the ACK message is configured to: determine that the ACK message is absent based on detecting for the ACK message; and determine that the interference level includes an energy measurement that is greater than or equal to an ED threshold when the ACK message is determined to be absent from the wireless channel.

In one configuration, the interference level is based on at least one of a CCA procedure by the UE or an eCCA by the UE, and the PG message includes information configuring a duration of the at least one of the CCA procedure or the eCCA procedure.

In one configuration, the apparatus 1302, and in particular the baseband unit 1304, may further include means for receiving the ACK message responsive to the PG message from the UE based on detecting for the ACK message, and the ACK message includes an indication of the interference level.

In one configuration, the indication of the interference level includes a quantized value.

In one configuration, the apparatus 1302, and in particular the baseband unit 1304, may further include means for transmitting, to the UE, information configuring one or more of a plurality of thresholds to a respective value, and the quantized value is based on the plurality of thresholds.

In one configuration, the apparatus 1302, and in particular the baseband unit 1304, may further include means for transmitting a set of CSI-RSs to the UE on the wireless channel, and the ACK message further includes at least one CSI report that is based on at least a subset of the set of CSI-RSs.

In one configuration, the at least one CSI report includes at least one of a short CSI report or fast CSI report.

In one configuration, the set of CSI-RSs is transmitted on a first set of resources at least partially overlapping with a second set of resources on which the PG message is transmitted.

In one configuration, the PG message includes a trigger for aperiodic CSI reporting, and the at least one CSI report is included in the ACK message based on the trigger for aperiodic CSI reporting.

In one configuration, the ACK message further includes an indication of an interfering spatial signature associated with the at least one CSI report.

The aforementioned means may be one or more of the aforementioned components of the apparatus 1302 configured to perform the functions recited by the aforementioned means. As described supra, the apparatus 1302 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following examples are illustrative only and may be combined with aspects of other embodiments or teachings described herein, without limitation.

Example 1 is a UE configured to receive a PG message from a base station on a wireless channel; determine an interference level associated with the wireless channel; and indicate the interference level to the base station in response to the PG message.

Example 2 is the UE of Example 1, and the interference level is determined based on a measurement indicative of interference proximate to the UE on the wireless channel, the measurement being determined in a duration associated with at least one of a CCA or an eCCA.

Example 3 is the UE of Example 2, and further configured to determine the measurement indicative of interference proximate to the UE on the wireless channel, and the interference level is based on the measurement indicative of the interference proximate to the UE on the wireless channel.

Example 4 is the UE of Example 3, and further configured to refrain from transmitting an ACK message responsive to the PG message to the base station when the measurement satisfies an ED threshold, and absence of the ACK message responsive to the PG message indicates the interference level to the base station.

Example 5 is the UE of Example 3, and further configured to transmit an ACK message responsive to the PG message to the base station, and the ACK message indicates the interference level based on the measurement indicative of the interference proximate to the UE on the wireless channel.

Example 6 is the UE of Example 5, and further configured to quantize the measurement based on comparison of the measurement to a plurality of thresholds, and the interference level is determined based on quantizing the measurement.

Example 7 is the UE of Example 6, and further configured to receive, from the base station, information configuring one or more of the plurality of thresholds to a respective value.

Example 8 is the UE of any of Examples 5 through 7, and further configured to receive a set of CSI-RSs from the base station on the wireless channel; and generate at least one CSI report based on receiving at least a subset of the set of CSI-RSs, and the ACK message includes the at least one CSI report.

Example 9 is the UE of Example 8, and the at least one CSI report includes at least one of a short CSI report or fast CSI report.

Example 10 is the UE of Examples 8 or 9, and the set of CSI-RSs is received on a first set of resources at least partially overlapping with a second set of resources on which the PG message is received.

Example 11 is the UE of any of Examples 8 through 10, and the PG message includes a trigger for aperiodic CSI reporting, and the at least one CSI report is included in the ACK message based on the trigger for aperiodic CSI reporting.

Example 12 is the UE of any of Examples 8 through 11, and further configured to determine an interfering spatial signature based on the interference on the wireless channel in response to receiving the PG message, and the at least one CSI report includes a plurality of CSI reports generated before the PG message is received that each is associated with a respective spatial signature; and determine an applicable CSI report from the plurality of CSI reports based on comparison of the interfering spatial signature to the respective spatial signatures, and the at least one CSI report included in the ACK message includes the applicable CSI report.

Example 13 is a base station configured to transmit a PG message to a UE on a wireless channel; detect for an ACK message responsive to the PG message from the UE; and determine an interference level associated with the wireless channel proximate to the UE based on detecting for the ACK message.

Example 14 is the base station of Example 13, and the determination of the interference level associated with the wireless channel proximate to the UE based on detecting for the ACK message includes to determine that the ACK message is absent based on detecting for the ACK message; and determine that the interference level includes an energy measurement that is greater than or equal to an ED threshold when the ACK message is determined to be absent from the wireless channel.

Example 15 is the base station of Examples 13 or 14, and the interference level is based on at least one of a CCA procedure by the UE or an eCCA by the UE, and the PG message includes information configuring a duration of the at least one of the CCA procedure or the eCCA procedure.

Example 16 is the base station of Example 13, and further configured to receive the ACK message responsive to the PG message from the UE based on detecting for the ACK message, and the ACK message includes an indication of the interference level.

Example 17 is the base station of Example 16, and the indication of the interference level includes a quantized value.

Example 18 is the base station of Example 17, and further configured to transmit, to the UE, information configuring one or more of a plurality of thresholds to a respective value, and the quantized value is based on the plurality of thresholds.

Example 19 is the base station of any of Examples 16 through 18, and further configured to transmit a set of CSI-RSs to the UE on the wireless channel, and the ACK message further includes at least one CSI report that is based on at least a subset of the set of CSI-RSs.

Example 20 is the base station of Example 19, and the at least one CSI report includes at least one of a short CSI report or fast CSI report.

Example 21 is the base station of Examples 19 or 20, and the set of CSI-RSs is transmitted on a first set of resources at least partially overlapping with a second set of resources on which the PG message is transmitted.

Example 22 is the base station of any of Examples 19 through 21, and the PG message includes a trigger for aperiodic CSI reporting, and the at least one CSI report is included in the ACK message based on the trigger for aperiodic CSI reporting.

Example 23 is the base station of any of Examples 19 through 22, and the ACK message further includes an indication of an interfering spatial signature associated with the at least one CSI report.

What is claimed is:

1. A method of wireless communication by a user equipment (UE), comprising:
   receiving a pre-grant message from a base station on a wireless channel;
   determining an interference level associated with the wireless channel;
   determining an applicable CSI report from a plurality of CSI reports based on comparison of an interfering spatial signature to respective spatial signatures associated with the plurality of CSI reports, wherein the interfering spatial signature is based on the interference on the wireless channel; and
   indicating the interference level in an acknowledgement (ACK) message to the base station in response to the pre-grant message, wherein the ACK message includes the applicable CSI report.

2. The method of claim 1, wherein the interference level is determined based on a measurement indicative of interference proximate to the UE on the wireless channel, the measurement being determined in a duration associated with at least one of a clear channel assessment (CCA) or an extended CCA (eCCA).

3. The method of claim 2, further comprising:
   determining the measurement indicative of interference proximate to the UE on the wireless channel,
   wherein the interference level is based on the measurement indicative of the interference proximate to the UE on the wireless channel.

4. The method of claim 3, further comprising:
   refraining from transmitting the ACK message responsive to the pre-grant message to the base station when the measurement satisfies an energy detection (ED) threshold,
   wherein absence of the ACK message responsive to the pre-grant message indicates the interference level to the base station.

5. The method of claim 3, further comprising:
transmitting the ACK message responsive to the pre-grant message to the base station, wherein the ACK message indicates the interference level based on the measurement indicative of the interference proximate to the UE on the wireless channel.

6. The method of claim 5, further comprising:
quantizing the measurement based on comparison of the measurement to a plurality of thresholds,
wherein the interference level is determined based on quantizing the measurement.

7. The method of claim 6, further comprising:
receiving, from the base station, information configuring one or more of the plurality of thresholds to a respective value.

8. The method of claim 5, further comprising:
receiving a set of channel state information (CSI) reference signals (RSs) from the base station on the wireless channel; and
generating at least one CSI report based on receiving at least a subset of the set of CSI-RSs,
wherein the ACK message includes the at least one CSI report.

9. The method of claim 8, wherein the at least one CSI report comprises at least one of a short CSI report or fast CSI report.

10. The method of claim 8, wherein the set of CSI-RSs is received on a first set of resources at least partially overlapping with a second set of resources on which the pre-grant message is received.

11. The method of claim 8, wherein the pre-grant message comprises a trigger for aperiodic CSI reporting, and the at least one CSI report is included in the ACK message based on the trigger for aperiodic CSI reporting.

12. The method of claim 8, further comprising:
determining the interfering spatial signature based on the interference on the wireless channel in response to receiving the pre-grant message, wherein the at least one CSI report comprises the plurality of CSI reports generated before the pre-grant message is received.

13. A method of wireless communication by a base station, comprising:
transmitting a pre-grant message to a user equipment (UE) on a wireless channel;
detecting for an acknowledgement (ACK) message responsive to the pre-grant message from the UE; and
determining an interference level associated with the wireless channel proximate to the UE based on detecting for the ACK message, wherein the ACK message includes a CSI report based on comparison of an interfering spatial signature to respective spatial signatures associated with a plurality of CSI reports, the interfering spatial signature based on the interference on the wireless channel.

14. The method of claim 13, wherein the determining the interference level associated with the wireless channel proximate to the UE based on detecting for the ACK message comprises:
determining that the ACK message is absent based on detecting for the ACK message; and
determining that the interference level comprises an energy measurement that is greater than or equal to an energy detection (ED) threshold when the ACK message is determined to be absent from the wireless channel.

15. The method of claim 13, wherein the interference level is based on at least one of a clear channel assessment (CCA) procedure by the UE or an extended CCA (eCCA) by the UE, and the pre-grant message comprises information configuring a duration of the at least one of the CCA procedure or the eCCA procedure.

16. The method of claim 13, further comprising:
receiving the acknowledgement (ACK) message responsive to the pre-grant message from the UE based on detecting for the ACK message, wherein the ACK message comprises an indication of the interference level.

17. The method of claim 16, wherein the indication of the interference level comprises a quantized value.

18. The method of claim 17, further comprising:
transmitting, to the UE, information configuring one or more of a plurality of thresholds to a respective value,
wherein the quantized value is based on the plurality of thresholds.

19. The method of claim 16, further comprising:
transmitting a set of channel state information (CSI) reference signals (RSs) to the UE on the wireless channel, and
wherein the ACK message further comprises at least one CSI report that is based on at least a subset of the set of CSI-RSs.

20. The method of claim 19, wherein the at least one CSI report comprises at least one of a short CSI report or fast CSI report.

21. The method of claim 19, wherein the set of CSI-RSs is transmitted on a first set of resources at least partially overlapping with a second set of resources on which the pre-grant message is transmitted.

22. The method of claim 19, wherein the pre-grant message comprises a trigger for aperiodic CSI reporting, and the at least one CSI report is included in the ACK message based on the trigger for aperiodic CSI reporting.

23. The method of claim 19, wherein the ACK message further comprises an indication of an interfering spatial signature associated with the at least one CSI report.

24. An apparatus for wireless communication by a user equipment (UE), comprising:
a memory; and
at least one processor coupled to the memory and configured to:
receive a pre-grant message from a base station on a wireless channel;
determine an interference level associated with the wireless channel;
determine an applicable CSI report from a plurality of CSI reports based on comparison of an interfering spatial signature to respective spatial signatures associated with the plurality of CSI reports, wherein the interfering spatial signature is based on the interference on the wireless channel; and
indicate the interference level in an acknowledgement (ACK) message to the base station in response to the pre-grant message, wherein the ACK message includes the applicable CSI report.

25. The apparatus of claim 24, wherein the interference level is determined based on a measurement indicative of interference proximate to the UE on the wireless channel, the measurement being determined in a duration associated with at least one of a clear channel assessment (CCA) or an extended CCA (eCCA).

26. The apparatus of claim 25, wherein the at least one processor is further configured to:
determine the measurement indicative of interference proximate to the UE on the wireless channel, wherein the interference level is based on the measurement indicative of the interference proximate to the UE on the wireless channel.

27. The apparatus of claim 26, wherein the at least one processor is further configured to:
transmitting the ACK message responsive to the pre-grant message to the base station, wherein the ACK message indicates the interference level based on the measurement indicative of the interference proximate to the UE on the wireless channel.

28. An apparatus for wireless communication by a base station, comprising:
a memory; and
at least one processor coupled to the memory and configured to:
transmit a pre-grant message to a user equipment (UE) on a wireless channel;
detect for an acknowledgement (ACK) message responsive to the pre-grant message from the UE; and
determine an interference level associated with the wireless channel proximate to the UE based on detecting for the ACK message, wherein the ACK message includes a CSI report based on comparison of an interfering spatial signature to respective spatial signatures associated with a plurality of CSI reports, the interfering spatial signature based on the interference on the wireless channel.

29. The apparatus of claim 28, wherein the determination of the interference level associated with the wireless channel proximate to the UE based on detecting for the ACK message comprises to:
determine that the ACK message is absent based on the detection for the ACK message; and
determine that the interference level comprises an energy measurement that is greater than or equal to an energy detection (ED) threshold when the ACK message is determined to be absent from the wireless channel.

30. The apparatus of claim 28, wherein the at least one processor is further configured to:
receive the acknowledgement (ACK) message responsive to the pre-grant message from the UE based on detecting for the ACK message, wherein the ACK message comprises an indication of the interference level.

* * * * *